United States Patent
Carlough et al.

(10) Patent No.: US 10,976,939 B2
(45) Date of Patent: *Apr. 13, 2021

(54) ADDRESS/COMMAND CHIP SYNCHRONIZED AUTONOMOUS DATA CHIP ADDRESS SEQUENCER FOR A DISTRIBUTED BUFFER MEMORY SYSTEM

(71) Applicant: International Business Machines Corporation, Armonk, NY (US)

(72) Inventors: Steven R. Carlough, Poughkeepsie, NY (US); Susan M. Eickhoff, Hopewell Junction, NY (US); Patrick J. Meaney, Poughkeepsie, NY (US); Stephen J. Powell, Austin, TX (US); Gary A. Van Huben, Poughkeepsie, NY (US); Jie Zheng, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,103

(22) Filed: Oct. 10, 2019

(65) Prior Publication Data

US 2020/0042205 A1    Feb. 6, 2020

Related U.S. Application Data

(63) Continuation of application No. 15/825,882, filed on Nov. 29, 2017, now Pat. No. 10,489,069.

(51) Int. Cl.
*G06F 3/06* (2006.01)
*G06F 12/06* (2006.01)

(52) U.S. Cl.
CPC ............ *G06F 3/0619* (2013.01); *G06F 3/065* (2013.01); *G06F 3/0659* (2013.01);
(Continued)

(58) Field of Classification Search
CPC .... G06F 3/0619; G06F 3/0685; G06F 3/0659; G06F 3/065; G06F 12/0638; G06F 12/02;
(Continued)

(56) References Cited

U.S. PATENT DOCUMENTS

| 5,815,723 A | 9/1998 | Wilkinson et al. |
| 6,104,751 A | 8/2000 | Artieri |

(Continued)

FOREIGN PATENT DOCUMENTS

| CN | 101099140 A | 1/2008 |
| CN | 105553636 A | 5/2016 |

OTHER PUBLICATIONS

Stratifylabs, A FIFO Buffer Implementation:, Oct. 2, 2013, pp. 1-5.
(Continued)

*Primary Examiner* — David Yi
*Assistant Examiner* — Nicholas A. Paperno
(74) *Attorney, Agent, or Firm* — Scully, Scott, Murphy & Presser, P.C.

(57) ABSTRACT

One or more memory systems, architectural structures, and/or methods of storing information in memory devices is disclosed to improve the data bandwidth and or to reduce the load on the communications links in a memory system. The system may include one or more memory devices, one or more memory control circuits and one or more data buffer circuits. In one embodiment, the Host only transmits data over its communications link with the data buffer circuit. In one aspect, the memory control circuit does not send a control signal to the data buffer circuits. In one aspect, the memory control circuit and the data buffer circuits each maintain a separate state machine-driven address pointer or local address sequencer, which contains the same tags in the same sequence. In another aspect, a resynchronization method is disclosed.

20 Claims, 10 Drawing Sheets

(52) U.S. Cl.
CPC ........ *G06F 3/0685* (2013.01); *G06F 12/0638* (2013.01); *G06F 2212/205* (2013.01)

(58) Field of Classification Search
CPC . G06F 13/16; G06F 13/1673; G06F 2212/205
See application file for complete search history.

(56) References Cited

U.S. PATENT DOCUMENTS

| | | | |
|---|---|---|---|
| 6,510,100 | B2 | 1/2003 | Grundon et al. |
| 7,330,992 | B2 | 2/2008 | Jeddeloh et al. |
| 7,984,359 | B2 | 7/2011 | Lastras-Montano et al. |
| 8,180,931 | B2 | 5/2012 | Lee et al. |
| 8,612,684 | B2 | 12/2013 | Briggs et al. |
| 8,788,747 | B2 | 7/2014 | Ahn et al. |
| 9,146,864 | B2 | 9/2015 | Retter et al. |
| 9,170,753 | B2 * | 10/2015 | Chen .................. G06F 3/0604 |
| 9,201,817 | B2 | 12/2015 | Chu et al. |
| 9,235,680 | B2 | 1/2016 | Rooyen et al. |
| 9,348,518 | B2 | 5/2016 | Fields, Jr. et al. |
| 9,430,418 | B2 | 8/2016 | Meaney et al. |
| 9,589,626 | B1 | 3/2017 | Liu et al. |
| 9,792,965 | B2 | 10/2017 | Best et al. |
| 9,836,415 | B2 | 12/2017 | Shan et al. |
| 10,223,299 | B2 | 3/2019 | Ware et al. |
| 10,395,698 | B2 | 8/2019 | Carlough et al. |
| 2001/0054121 | A1 | 12/2001 | Proch et al. |
| 2005/0177657 | A1 | 8/2005 | Pope et al. |
| 2006/0179213 | A1 | 8/2006 | Brittain et al. |
| 2011/0087808 | A1 | 4/2011 | Durand et al. |
| 2012/0233500 | A1 | 9/2012 | Roettfermann et al. |
| 2014/0281191 | A1 | 9/2014 | Retter et al. |
| 2015/0006841 | A1 | 1/2015 | Chen et al. |
| 2015/0160920 | A1 | 6/2015 | Bergkvist, Jr. et al. |
| 2015/0255130 | A1 | 9/2015 | Lee et al. |
| 2015/0261446 | A1 | 9/2015 | Lee |
| 2016/0092361 | A1 | 3/2016 | Grimsrud et al. |
| 2017/0109058 | A1 | 4/2017 | Shallal et al. |
| 2018/0181504 | A1 | 6/2018 | Morris et al. |
| 2019/0163362 | A1 | 5/2019 | Carlough et al. |
| 2019/0163384 | A1 | 5/2019 | Carlough et al. |

OTHER PUBLICATIONS

Anonymous, "Hardware Engine (CCS) for Initialization and Test of DDR3 and DDR4 DRAMs", IP.com Prior Art Database Technical Disclosure, IP.com No. IPCOM000228100D, Jun. 6, 2013, 6 pages.
Siemens et al.. "Buffer Device for Memory Modules (DIMM)", IP.com Prior Art Database Technical Disclosure, IP.com No. IPCOM000144850D, Feb. 10, 2007, 2 pages.
IBM, "Memory Controller and Protocol for Small-Granularity DRAM-access", IP.com Prior Art Database Technical Disclosure, IP.com No. IPCOM000182894D, May 8, 2009, 4 pages.
Hovis, et al., "Method for Reduction in Memory Requirements Via Tag Bit Replication", IBM Technical Disclosure Bulletin, vol. 38, No. 4, Apr. 1995, pp. 513-515.
Office Action dated Apr. 19, 2019 issued in U.S. Appl. No. 15/825,867.
Office Action dated May 15, 2019 issued in U.S. Appl. No. 15/825,909.
International Search Report and Written Opinion dated Mar. 11, 2019 issued in International Application No. PCT/IB2018/059206.
List of IBM Patents or Patent Applications Treated as Related.
English-language translation of a German Office Action dated Feb. 2, 2021 received in a corresponding foreign application, 9 pages.

* cited by examiner

| BEAT | CA0 | CA1 | CA2 | CA3 | CA4 | CA5 | CA6 | CA7 |
|---|---|---|---|---|---|---|---|---|
| 1 | L0 | L1 | A0 | A1 | A2 | A3 | A4 | A5 |
| 2 | A6 | A7 | A8 | A9 | A10 | A11 | A12 | A13 |
| 3 | A14 | A15 | A16 | A17 | A18 | A19 | A20 | A21 |
| 4 | A22 | A23 | A24 | A25 | A26 | A27 | A28 | A29 |
| 5 | A30 | A31 | A32 | A33 | A34 | A35 | A36 | A37 |
| 6 | A38 | C0 | C1 | C2 | C3 | Q0 | Q1 | Q2 |
| 7 | Q3 | Q4 | Q5 | Q6 | ACK | P0 | P1 | P2 |
| 8 | P3 | P4 | P5 | P6 | P7 | P8 | P9 | P10 |

Fig. 5

| Memory Cycle 1 | | | Memory Cycle 3 | | | Memory Cycle 5 | | | Memory Cycle 7 | | | Memory Cycle 9 | | |
|---|---|---|---|---|---|---|---|---|---|---|---|---|---|---|
| Beat | RX0 | RX1 | Beat | RX0 | RX1 | Beat | RX0 | RX1 | Beat | RX0 | RX1 | Beat | RX0 | RX1 |
| 0 | D0 | D8 | 16 | D32 | D40 | 32 | D64 | D72 | 48 | D96 | D104 | 64 | CRC0 | CRC8 |
| 1 | D1 | D9 | 17 | D33 | D41 | 33 | D65 | D73 | 49 | D97 | D105 | 65 | CRC1 | CRC9 |
| 2 | D2 | D10 | 18 | D34 | D42 | 34 | D66 | D74 | 50 | D98 | D106 | 66 | CRC2 | CRC10 |
| 3 | D3 | D11 | 19 | D35 | D43 | 35 | D67 | D75 | 51 | D99 | D107 | 67 | CRC3 | CRC11 |
| 4 | D4 | D12 | 20 | O36 | D44 | 36 | O68 | D76 | 52 | D100 | D108 | 68 | CRC4 | CRC12 |
| 5 | D5 | D13 | 21 | D37 | D45 | 37 | D69 | D77 | 53 | D101 | D109 | 69 | CRC5 | CRC13 |
| 6 | D6 | D14 | 22 | D38 | D46 | 38 | D70 | D78 | 54 | O102 | D110 | 70 | CRC6 | CRC14 |
| 7 | D7 | D15 | 23 | D39 | D47 | 39 | D71 | 79 | 55 | O103 | D111 | 71 | CRC7 | CRC15 |
| Memory Cycle 2 | | | Memory Cycle 4 | | | Memory Cycle 6 | | | Memory Cycle 8 | | | | | |
| 8 | D16 | O24 | 24 | D48 | D56 | 40 | D80 | D88 | 56 | D112 | D120 | | | |
| 9 | D17 | D25 | 25 | D49 | D57 | 41 | D81 | D89 | 57 | D113 | D121 | | | |
| 10 | D18 | D26 | 26 | D50 | D58 | 42 | D82 | D90 | 58 | D114 | D122 | | | |
| 11 | O19 | D27 | 27 | D51 | D59 | 43 | D83 | D91 | 59 | D115 | O123 | | | |
| 12 | D20 | D28 | 28 | D52 | D60 | 44 | D84 | D92 | 60 | D116 | D124 | | | |
| 13 | D21 | D29 | 29 | D53 | D61 | 45 | D85 | D93 | 61 | D117 | D125 | | | |
| 14 | D22 | D30 | 30 | D54 | D62 | 46 | D86 | D94 | 62 | D118 | D126 | | | |
| 15 | D23 | D31 | 31 | D55 | D63 | 47 | D87 | D95 | 63 | D119 | D127 | | | |

Fig. 6

| Memory Cycle 1 | | Memory Cycle 2 | | Memory Cycle 3 | | Memory Cycle 4 | |
|---|---|---|---|---|---|---|---|
| Beat | CA | Beat | CA | Beat | CA | Beat | CA |
| 0 | T0 = 1 | 8 | Q6-0p1 | 16 | R0-op1 | 24 | Reserved |
| 1 | T1 = 1 | 9 | Q0-op2 | 17 | R1-op1 | 25 | CRC0 |
| 2 | Q0-op1 | 10 | Q1-op2 | 18 | D0-op1 | 26 | CRC1 |
| 3 | Q1-op1 | 11 | Q2-op2 | 19 | D1-op1 | 27 | CRC2 |
| 4 | Q2-op1 | 12 | Q3-op2 | 20 | R0-op2 | 28 | CRC3 |
| 5 | Q3-op1 | 13 | Q4-op2 | 21 | R1-op2 | 29 | CRC4 |
| 6 | Q4-op1 | 14 | Q5-op2 | 22 | D0-op2 | 30 | CRC5 |
| 7 | Q5-op1 | 15 | Q6-op2 | 23 | D1-op2 | 31 | Ack |

Fig. 7

ADDRESS/COMMAND CHIP SYNCHRONIZED AUTONOMOUS DATA CHIP ADDRESS SEQUENCER FOR A DISTRIBUTED BUFFER MEMORY SYSTEM

CROSS-REFERENCE TO RELATED APPLICATIONS

This patent document claims priority to, and is a continuation of U.S. patent application Ser. No. 15/825,882, filed Nov. 29, 2017. The disclosure of the priority application is fully incorporated by reference.

BACKGROUND

The present invention relates to memory systems and more particularly distributed buffer memory systems.

With recent advancement of information technology and wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

The constantly increasing speed of processors which execute increasingly complex applications places more rigorous performance demands on all of the other subsystems in the computer, including the memory subsystem, where data is stored, accessed, and updated numerous times during the operation of a software application. The time consumed by memory read/write operations is a major factor in the ultimate speed and efficiency of a computer system. The memory subsystem of most computers is normally operated by a memory controller. The task of memory controllers is to move data between the computer's memory subsystem and its one or more processors as quickly and efficiently as possible. A computer's memory subsystem often comprises memory modules, usually one or more dual in-line memory modules (DIMMs) that include several dynamic random access memory (DRAM) devices.

In many memory subsystems, a memory controller may control multiple memory channels, where each channel may include one or more Dual In-line Memory Modules (DIMMs), where the DIMMs may be arranged in one or more ranks. Computing demands require the ability to access an increasing number of higher density memory devices at faster and faster access speeds.

Extensive research and development efforts are invested by the industry to create improved and or innovative solutions to maximize overall system performance by improving the memory system/subsystem design and/or structure and the methods by which the memory system/subsystem operates. Such efforts have resulted in the development of distributed memory systems, distributed buffer memory systems, registered DIMMs (RDIMMs) and load reduced DIMMs (LRDIMMs), and other systems, specifications and standards such as, for example, DDR4 and DDR5, which provide for increased memory performance.

In one example, a distributed memory system may include a plurality of memory devices, one or more Address Chips, also known as memory control circuits, and a plurality of data buffer or data circuits (DC), also known as DC chips. There are communication links or buses between a Host processor and the memory control circuits and data buffer circuits. There is also a communication link or bus from the memory control circuits to the data buffer circuits. There are also communication links between the memory devices, e.g., DRAMS, and the memory control circuits and the data buffer circuits. Bandwidth limitations on communication links can affect performance of memory systems. The amount of data, command, control and response signals sent over communication links and busses between the Host, the memory control circuits, the data buffer circuits, and the memory devices, which includes the bandwidth allocated to transmit store data control functions, e.g., the store data address tags and locations, impacts performance of memory systems.

SUMMARY

The summary of the disclosure is given to aid understanding of a memory system, architectural structure, and method of storing and fetching data, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In one embodiment a memory system for storing data in response to commands received from a Host is disclosed, the memory system comprising a memory control circuit to receive commands from the Host and to output module command and control signals, at least one and preferably a plurality of memory devices configured to store data and receive command signals from the memory control circuit, at least one and preferably a plurality of data buffer circuits associated with the at least one memory device, a communications link for communicating data between the Host and the at least one data buffer circuit, and a control communications link between the memory control circuit and the at least one data buffer circuit. In one embodiment the memory control circuit is configured to: obtain a local store data tag from a memory control circuit local address sequencer in response to receiving a store command and store data tag from the Host, associate the Host store data tag with the memory control circuit store data tag, and store the relationship in a mapping table in the memory control circuit. In one aspect, the system does not send a store data tag to the at least one data buffer circuit specifying the location to store data in the at least one data buffer circuit over the communications link between the Host and the at least one data buffer circuit.

In another embodiment, a memory system for reading and writing data to a memory device is disclosed where the system comprises at least one memory control circuit to receive commands from a Host and to output command and control signals, the memory control circuit having a local address sequencer that has local store tag locations in a sequence; at least one and preferably a plurality of memory devices configured to read and store data, and receive command signals from the memory control circuit; at least one and preferably a plurality of data buffer circuits associated with the at least one memory control circuit, the at least one data buffer circuit having a local address sequencer which has local store tag locations in the same sequence as the local address sequencer of the at least one memory control circuit; a data communications link for communicating data between the Host and the at least one data buffer circuit; and a control communications link between the at least one memory control circuit, the at least one memory device and the at least one data buffer circuit for transmitting reading and writing operation signals of the memory system; wherein the at least one memory control circuit is configured to: (i) process a store command into a write-to-buffer command and a store-from-buffer command; (ii) obtain a local store data tag from a local address sequencer of the at least one memory control circuit upon receiving a store command; (iii) send the write-to-buffer command to the at least one data buffer circuit; (iv) send the store command to the at least one memory device; and (iv) send the store-from-buffer command along with store data tag to the at least one data buffer circuit; and wherein the at least one data buffer circuit is configured to: (i) obtain a local store data tag from a local address sequencer of the at least one data buffer circuit upon receiving the write-to-buffer command; (ii) send incoming store data into data buffer pointed to by the local store data tag obtained by the local address sequencer of the at least one data buffer circuit; (iii) pull out store data from the local data buffer pointed to by store data tag received from the at least one memory control circuit, and (iv) send store data to the at least one memory device.

Also disclosed is a method for storing data in memory devices, the method comprising obtaining a local store data tag from an address sequencer in a memory control circuit upon receiving a host store command, associating a host tag to the memory control circuit local store data tag and storing the associated tags in a mapping table; processing the store command in the memory control circuit into a write-to-buffer command and a store-from-buffer command; sending the write-to-buffer command to a data buffer circuit; obtaining a local store data tag from an address sequencer in a data buffer circuit; and pushing incoming data into the location in the data buffer circuit pointed to by the local store data tag obtained from the data buffer circuit local address sequencer. In one embodiment, the data buffer circuit pushes incoming data into the data buffer upon receiving the write-to-buffer command. Preferably, the memory control circuit and the data buffer circuit each maintain a separate local address sequencer that contains the same tags in the same sequence. And in an embodiment, the memory control circuit is configured not to send the tag received from the memory control circuit local address sequencer to the data buffer circuit.

A method of checking local address sequencers in a distributed memory system having a remote memory control circuit is also disclosed, the method comprising pulling a next to be used store data tag from each local address sequencer of a plurality of data buffer circuits, comparing the store data tags recovered from the local address sequencer of each data buffer circuit, and if any of the tags from the data buffer circuits are different, issuing a recovery command. Another method of checking the local address sequencers in a memory system having a remote memory control circuit is disclosed, the method comprising sending the next tag to be issued from a local address sequencer of the memory control circuit to a data buffer circuit, comparing the next tag to be issued from a local address sequencer of the data buffer circuit against the next to be used tag sent by the memory control circuit, and if the tags do not match, issuing a recovery command. The recovery command may include at least one of the group consisting of stop sending out any new operations, flushing all incomplete operations, waiting for all fetch operations to complete, and combinations thereof. The method according to one embodiment may further include resetting the local address sequencer of both a memory control circuit and the data buffer circuits.

BRIEF DESCRIPTION OF THE DRAWINGS

The various aspects, features and embodiments of the memory system, architectural structure and its method of operation will be better understood when read in conjunction with the figures provided. Embodiments are provided in the figures for the purpose of illustrating aspects, features and/or various embodiments of the memory system, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

FIG. 5 shows the command and address frame sent over a communications link between the Host and a memory control circuit in accordance with one embodiment.

FIG. 6 shows a data frame sent over a communications link from Host to a data buffer circuit in accordance with an embodiment.

FIG. 7 shows a frame sent over a communications link from a memory control circuit to the Host in accordance with one embodiment.

DETAILED DESCRIPTION

Figure 1:
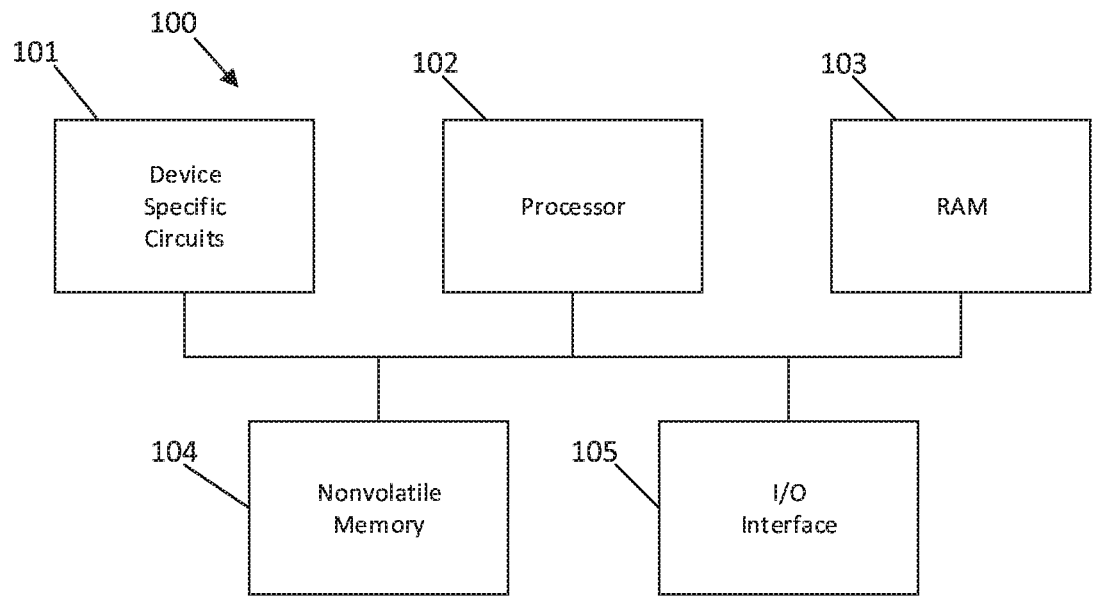
FIG. 1 depicts a general computing or data processing system in accordance with one embodiment.

The following description is made for illustrating the general principles of the invention and is not meant to limit the inventive concepts claimed herein. In the following detailed description, numerous details are set forth in order to provide an understanding of the memory system, architectural structure and method of operation, however, it will be understood by those skilled in the art that different and numerous embodiments of the memory system, architectural structure and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

A computer's memory subsystem often comprises memory modules, usually one or more dual in-line memory modules (DIMMs), which usually include a plurality of memory devices, e.g., dynamic random access memory (DRAM) devices. A distributed memory system may include a plurality of memory devices, e.g., DRAMS, which may be arranged on a module as a DIMM, one or more memory control circuits, and one or more data buffer circuits or data circuits. In one embodiment, the memory control circuit receives signals from a Host processor and outputs command and control signals. The memory control circuit may include a memory controller, and in one embodiment, may have a scheduler, which may be in the form of a circuit. The memory control circuit and/or memory controller in one embodiment may be remote from the Host processor, the data buffer circuits, and/or the memory devices. The memory control circuit, e.g., the scheduler, may optimize the order of operations and instructions, and sends out command signals (e.g., instructions) to the data buffer circuits and the memory devices. There are communication links or buses between the Host (e.g., processor), the memory control circuits, the data buffer circuits, and/or the memory devices. In one embodiment, there is a communication bus or link from the memory control circuit to the data buffer circuits. In one embodiment, there may also be a communication link or bus between the Host and the memory control circuit, and separate communications links or buses between the Host and the data buffer circuits. The memory system, and/or architectural structure may further include communications links or buses between the memory devices and the memory control circuit and/or the memory devices and the data buffer circuits.

Memory systems, memory architecture, and/or methods of performing read/write operations in a memory system or subsystem, including, for example, a distributed memory system, are disclosed. In one embodiment, a memory system, architectural structure, and/or method of storing and/or fetching data in memory systems, including memory devices, is disclosed. The memory system as disclosed in more detail below may include one or more memory devices, and one or more data buffer circuits. The memory system may further include a memory control circuit, which may in one embodiment include a memory controller to control the flow of data going to and from the memory devices. There may be communication links or buses for transferring data, commands, responses, and/or signals between the Host, the memory devices, the data buffer circuits, and/or the memory control circuits.

In one aspect, the memory system, architectural structure, and/or method for performing read/write operations improves the data bandwidth on the communication link between the Host and data buffer circuits. In another embodiment, a memory system, architectural structure, and/or method to reduce the load on the communications link between the memory control circuit and the data buffer circuits is disclosed. In one embodiment, a memory system, architectural structure, and/or method of storing write data to the data buffer circuit is disclosed. In one aspect, a memory system, architectural structure and/or method of managing store data at the data buffer circuit without sending control information, e.g., store data location tag address, from the memory control circuit is disclosed. In one embodiment, the disclosure provides a system, architectural structure, and/or method for the data buffer circuits to put store data into their write buffer at a location that is known by the memory control circuit without the data buffer circuits telling the memory control circuit where the data buffer circuits placed the data, and without the memory control circuit telling the data buffer circuit where to place the data. In one aspect, the memory control circuit receives the store command and the store data tag from Host and sends the store data command to the data buffer circuits, but the memory control circuit does not send the store data tag to the data buffer circuits. In one aspect, the memory control circuit and the data buffer circuits each maintain a separate state machine-driven address pointer or local address sequencer, e.g., local store tag FIFO, which contains the same tags (identifying an address or location in the data buffer) in the same sequence. Both the memory control circuit and the data buffer circuits use the same tag from its address sequencer, e.g. local store tag FIFO, for a store operation. The memory control circuit associates or maps the Host store data tag to its local store data tag FIFO and stores the Host store data tag to a mapping table.

In another aspect of the system, the memory control circuit is further configured to process the store command into a write-to-buffer command and store-from-buffer command in response to receiving the Host store command, and send the write-to-buffer command to the at least one data buffer circuit over the control communications link, but not send a tag to the data buffer circuit specifying the location to store the data in the data buffer circuit. In one embodiment, the data buffer circuit includes a logic circuit to track where to write data for a store operation in the data buffer circuit. The at least one data buffer circuit of the system may be further configured to obtain a local store data tag from a data buffer circuit local address sequencer that points to a storage location within the at least one data buffer circuit in response to receiving a write-to-buffer command, and push incoming store data into the data buffer pointed to by the data buffer circuit's local address sequencer.

The memory control circuit, in one embodiment, may be further configured to send the store-from-buffer command along with the local store data tag received from its local address sequencer to the at least one data buffer circuit over the control communications link, and to send the store command to the at least one memory device. And, in one embodiment the at least one data buffer circuit is further configured to cause the at least one data buffer circuit to pull store data from the data buffer location pointed to by the store data tag received from the memory control circuit over the control communications link and send the store data to the at least one memory device.

In one aspect of the system, the memory control circuit comprises a state machine-driven local address pointer that identifies the next address tag location of the at least one data buffer circuit to write data to, and wherein the at least one data buffer circuit comprises a state machine-driven local address pointer that identifies the next address tag location of the at least one data buffer circuit to write data, wherein the state machine-driven local address pointer of the memory control circuit is synchronized with the state machine-driven local address pointer of the at least one data buffer circuit. In an embodiment, the memory control circuit local address sequencer and the at least one data buffer circuit local address sequencer both contain the same tags in the same sequence. In a further aspect, the memory control circuit of the memory system does not send a write-to-buffer data tag to the at least one data buffer circuit. In one aspect, the data communications link in the memory system includes a communications link between the Host and the at least one data buffer circuit, and the at least one data buffer circuit and the at least one memory device, and only data and CRC is transmitted on the communications link between the at least one data buffer circuit and the Host.

The memory system in one embodiment comprises at least one module having the memory control circuit formed on a single chip on the module, having at least nine data buffer circuits formed on separate chips on the module, and a plurality of memory devices organized in groups of nine arranged on the module.

Also disclosed is a method for storing data in memory devices, the method comprising obtaining a local store data tag from an address sequencer in a memory control circuit upon receiving a host store command, associating a host tag to the memory control circuit local store data tag and storing the associated tags in a mapping table; processing the store command in the memory control circuit into a write-to-buffer command and a store-from-buffer command; sending the write-to-buffer command to a data buffer circuit; obtaining a local store data tag from an address sequencer in a data buffer circuit; and pushing incoming data into the location in the data buffer circuit pointed to by the local store data tag obtained from the data buffer circuit local address sequencer. In one embodiment, the data buffer circuit pushes incoming data into the data buffer upon receiving the write-to-buffer command. Preferably, the memory control circuit and the data buffer circuit each maintain a separate local address sequencer that contains the same tags in the same sequence. And in an embodiment, the memory control circuit is configured not to send the tag received from the memory control circuit local address sequencer to the data buffer circuit.

The method may further include sending the store command from the memory control circuit to the memory devices, and sending data from the location pointed to by the local store data tag obtained from the data buffer circuit local address sequencer to the memory devices. In a further aspect, the method includes pushing the local store data tag back to the data buffer circuit local address sequencer, retrieving the host store data tag from the memory control circuit mapping table associated with the memory control circuit local store data tag, pushing the local store data tag back to the memory control circuit local address sequencer, and pushing the host store data tag back to the host.

In another aspect, to increase reliability, and resist and avoid the local address sequencers, e.g., local store tag FIFO, from getting out of synchronization, a periodic tag check and resynchronization or recovery method is implemented. The system according to one aspect is further configured to check whether the state machine-driven local address pointer of the at least one memory control circuit has the same next tag as the state machine-driven local address pointer of the at least one data buffer circuit. The system may be further configured so that if the memory control circuit state machine-driven local address pointer is not pointing to the same address as the data buffer circuit state machine-driven local address pointer, then the memory control circuit local address pointer and the data buffer circuit local address pointer are both reset. In a further aspect, the system may be configured so that if the memory control circuit state machine-driven local address pointer is not the same as the data buffer circuit state machine-driven local address pointer, then the system resets the memory control circuit local address pointer and the data buffer circuit local address pointer. In one embodiment, the memory control circuit can send the next to be used store data tag from its local address sequencer to the data buffer circuits and the data buffer circuit compares its next to be used tag from its local address sequencer against the tag sent by the memory control circuit to see if the tags are the same. In another embodiment, the data buffer circuit can send the next to be used store data tag to Host, and Host compares the tag received from each data buffer circuit to see if they are the same. If the tags are not the same, the system may undergo a recovery routine, which may among other things, reset the local address sequencers.

A computer program product for storing data in memory devices is disclosed, the computer program product comprising a computer readable storage medium having program instructions embodied therewith, the program instructions executable by a memory system to cause the memory system to perform a method, the memory system in one embodiment may include a memory control circuit, one or more data buffer circuits and a plurality of memory devices, the method comprising obtaining a local store data tag from an address sequencer in a memory control circuit upon receiving a host store command, associating a host tag to the memory control circuit local store data tag and storing the associated tags in a mapping table, processing the store command in the memory control circuit into a write-to-buffer command and a store-from-buffer command; sending the write-to-buffer command to a data buffer circuit, obtaining a local store data tag from an address sequencer in a data buffer circuit, and pushing incoming data into the location in the data buffer circuit pointed to by the local store data tag obtained from the data buffer circuit local address sequencer. In one embodiment, the computer program product further comprising the data buffer circuit pushing incoming data into the data buffer upon receiving the write-to-buffer command. The computer program product according to one aspect, wherein the memory control circuit and the data buffer circuit each maintain a separate local address sequencer that contains the same tags in the same sequence, according to another aspect wherein the memory control circuit is configured not to send the tag received from the memory control circuit local address sequencer to the data buffer circuit.

The computer program product wherein the method further comprises sending the store command from the memory control circuit to the memory devices, and sending data from the location pointed to by the local store data tag obtained from the data buffer circuit local address sequencer to the memory devices. The computer program product wherein the method further comprising pushing the local store data tag back to the data buffer circuit local address sequencer, retrieving the host store data tag from the memory control circuit mapping table associated with the memory control circuit local store data tag, pushing the local store data tag back to the memory control circuit local address sequencer, and pushing the host store data tag back to the host. The computer program product wherein the method further comprises pulling a next to be used store data tag from each local address sequencer of a plurality of data buffer circuits, comparing the store data tags recovered from the local address sequencer of each data buffer circuit, and if any of the tags from the data buffer circuits are different, issuing a recovery command. The computer program product wherein the method according to one embodiment includes sending the next tag to be issued from a local address sequencer of the memory control circuit to a data buffer circuit, comparing the next tag to be issued from a local address sequencer of the data buffer circuit against the next to be used tag sent by the memory control circuit, and if the tags do not match, issuing a recovery command.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
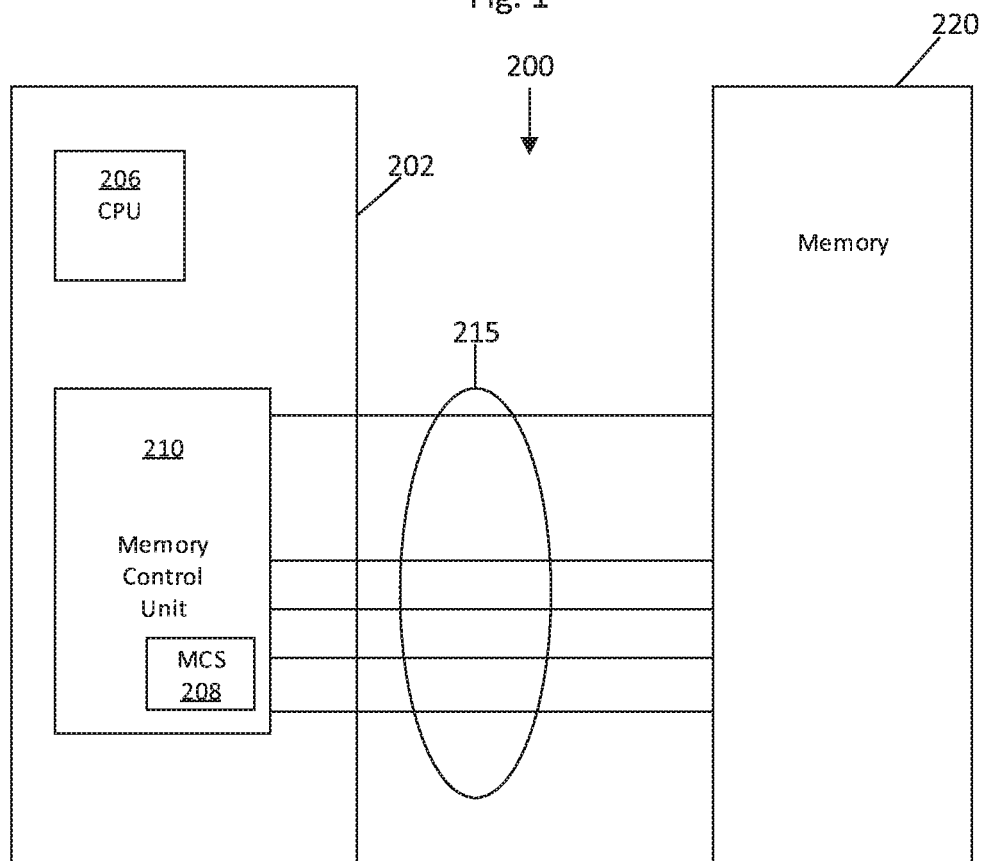
FIG. 2 depicts a memory subsystem in accordance with an embodiment.

FIG. 2 depicts an exemplary memory system 200 that may be part of a larger computer system structure or network. The computer system 200 includes a control processor system 202, which is a processing subsystem that includes at least one processor unit (CPU) 206 that may be configured to interface with a Memory Control Unit (MCU) 210. The processor or CPU 206 may be a module that processes read, write, and configuration requests from a system controller (not depicted). The processor 206 may be a multi-core processor. The MCU 210 may include a memory controller synchronous (MCS) 208, also referred to as a memory controller, that controls communication with one or more memory devices 250 (not shown in FIG. 1) in a memory subsystem 220. The MCU 210 and the MCS 208 may include one or more processing circuits, or processing may be performed by or in conjunction with the processor 206. The control processor system 202 communicates with the memory subsystem 220 through a communications bus 215 as will be described in more detail in connection with FIG. 4. Control processor system 202, processor or CPU 206, memory control unit 210, and MCS 208, individually and collectively, may be referred to herein as the Host. The Host as used herein is used broadly to refer to a processor, controller, or device that sends and receives command and/or control signals to a memory system or subsystem. The Host may also send and receive data signals from a memory system or subsystem.

Figure 3:
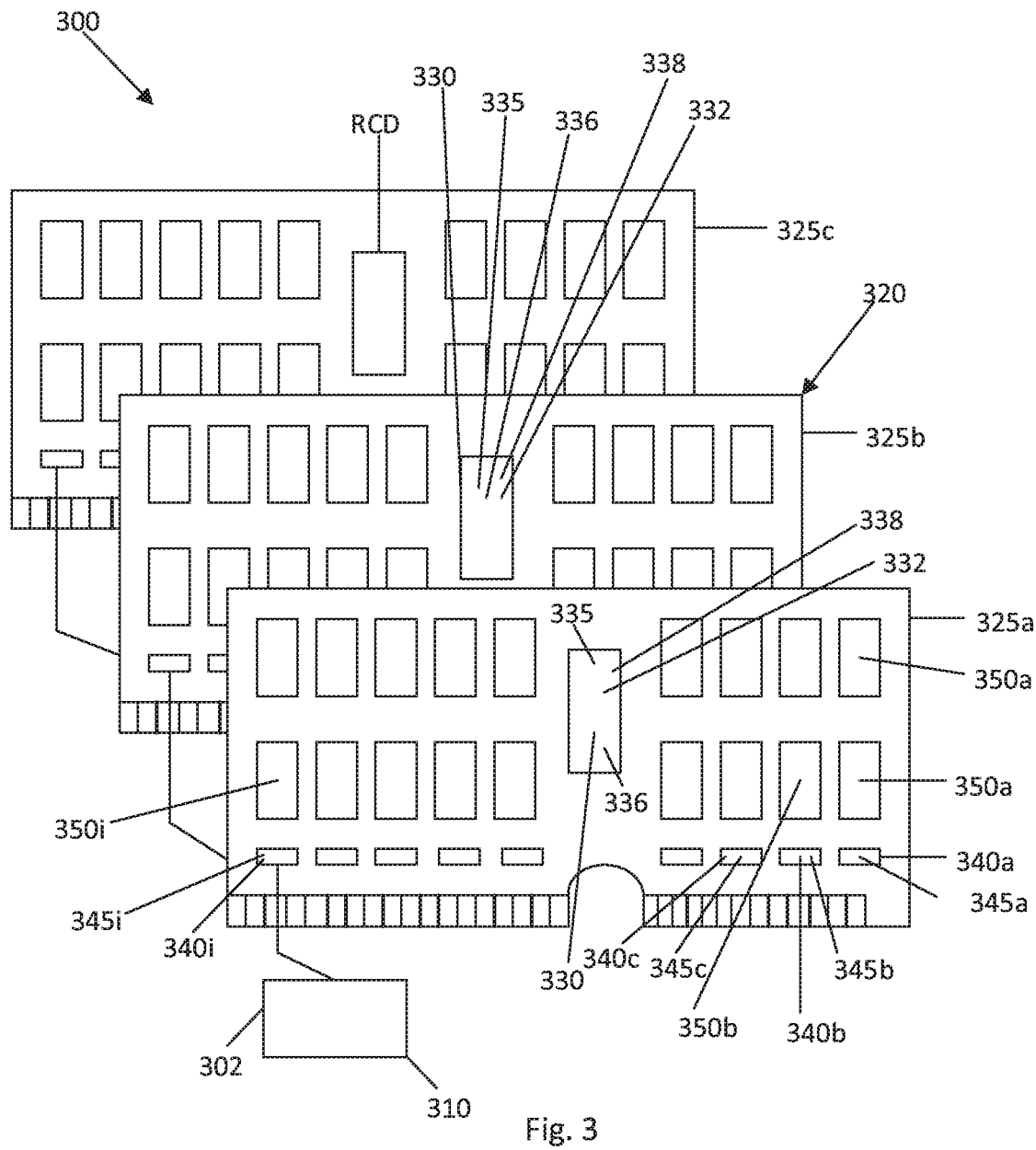
FIG. 3 depicts a memory subsystem including a buffered DIMM configuration in accordance with an embodiment.

FIG. 3 depicts an example of a memory subsystem 320. Memory system 320 comprises a plurality of memory modules, e.g., Dual Inline Memory Modules or DIMMs 325. While only three (3) DIMMs 325a-c are shown in FIG. 3, it will be appreciated that memory subsystem 320 may contain more or less DIMMs 325. The DIMMs 325 may be arranged in channels and ranks, with one or more DIMMs 325 per channel or rank. Each DIMM 325 may contain one or more volatile memory devices, e.g., Dynamic Random Access Memory chips or DRAMs 350. The memory devices 350 may be integrated circuits or chips and form the basic memory cells that hold bits of information. The memory cells in a memory device, e.g., DRAM, are usually arranged in banks, where each bank is an array of rows and columns.

The memory subsystem may also include one or more memory control circuits 330, one or more data buffer or data (DC) circuits or (DC) chips 340, and one or more memory devices 350. The memory control circuit manages the flow of data going to and from the memory devices. The memory control circuit typically receives signals such as command and control signals from a Host, e.g., a Host processor. The control signals may include address locations or tags on where to store data in the memory devices. The memory control circuit may output command and control signals to the memory devices and/or data buffer circuits. The memory control circuits 330 for ease of reference may also be referred to as address and command circuits, AC circuits, or AC chips. The memory control circuit 330 may or may not have a Registered Clock Driver or RCD. The memory control circuit 330 in one embodiment may have a memory controller 332. The memory control circuit 330 or memory controller 332 may have a scheduler 338. The memory controller 332 and/or scheduler 338 may optimize the order of operations and instructions, and sends out signals to the data buffer circuits and the memory devices. The memory control circuit 330/memory controller 332/memory scheduler 338 may reorder the sequence of operations. The memory control circuit may or may not be located on the board or module, e.g., DIMM, with the memory devices. In embodiments, as shown in FIG. 3, the memory control circuits 330 are formed as an integrated circuit or chip and are located on the module 325 with the memory devices 350. In one embodiment, the memory control circuit may be remote from the Host processor.

The data buffer circuits 340 buffer, receive, transmit, and/or transfer data between the Host, e.g., control processor system 302, and the memory devices 350. The data buffer circuits may or may not be located on the same board or module, e.g., DIMM, as the memory devices and/or the memory control circuits. The data buffer circuits 340 in one embodiment are also formed as integrated circuits or chips and are located on the module 325 with the memory devices

350. The data buffer circuits may also be referred to as data circuits, DC circuits, and/or DC chips.

In the example of FIG. 3, a distributed memory system 300 is illustrated having a memory control processor 302 and/or memory control unit 310, and a memory subsystem 320. The memory control unit 310, and/or memory control processor 302, may be a Host. The memory or data storage system 320 may be configured to store data and to provide storage services to one or more Hosts, which may be connected to the storage system 320 directly or through a network, (e.g., over the internet). The storage system may include an interface for supporting communications with the Host.

In the embodiment of FIG. 3, the memory subsystem 300 has three (3) DIMMS 325*a-c*. The distributed memory system 300 may have one or more control processors systems 302, and may have more or less DIMMs 325. In the distributed memory system 300 of FIG. 3, each memory module 325 is configured as a DIMM and has one memory control circuit or AC chip 330, nine (9) data buffer circuits or DC chips 340, and thirty-six (36) memory devices 350, e.g., DRAMs. The memory control circuit is configured and programmed to send command and control signals to the data buffer circuits and the memory devices. Each memory control chip or AC chip 330 in this example manages the flow of data to and from the memory devices on the module 325. Each data buffer circuit or DC chip 340 in this example interacts with and buffers data between four memory devices 350. The DIMMs may include memory devices, e.g., DRAMs, preferably arranged and organized in groups of nine, e.g., 9, 18, 27, 36 or more, or groups of ten, e.g., 10, 20, 30, or more.

Other configurations are contemplated for the memory module 325, and for the memory subsystem 320. Typically there is one memory control chip 330 per nine or ten data buffer chips 340. As an example, a DDR4 memory system may include a memory control circuit or AC chip and a group of nine (9) data buffer circuits or DC chips. While the memory device structure and/or module of FIG. 3 shows the memory devices 350 in groups of nine, it is contemplated that the memory devices may be arranged in groups of ten or more. In the example of FIG. 3, one AC chip per DIMM is illustrated, although more AC chips per DIMM may be used. The memory system architecture may be formatted and structured to support DDR4 and DDR5 standards, although the methods, systems and architecture disclosed and taught would be applicable to other configurations, including future standards.

In one example, the data buffer circuits or DC chips 340 may each have a write buffer array that is used to hold store operations from the Host processor 302 (memory control unit 310) until the memory controller 332 on the memory control circuit 330 can schedule them. There are communications buses or links between the Host 302 and the memory control circuit 330 and between the memory control circuit 330 and the memory devices 350. There is also a data communications link or bus between the Host 302 and the data buffer circuits 340 and the data buffer circuits 340 and the memory devices 350. There may be a communication link or bus 332 from the memory control circuit 330 to the data buffer circuits or DC chips 340. The communication link or bus between the memory control circuit 330 and the data buffer circuits 340 may be a one way broadcast communication link or bus called BCOM. More information on specific embodiments of the communication buses and links will be described below.

The bandwidth of the communication links impact performance of the memory system 300. In one or more embodiments, the memory system, architectural structure, and/or method of operation provide improvements in storing and/or retrieving data between a Host and one or more memory devices. In one embodiment, a memory system, architectural structure, and/or method is disclosed to improve the performance and/or bandwidth available for data on the communication link between the Host 302 and the data buffer circuit or DC chip 340. In one embodiment, the bandwidth of the communications link between the Host 302 and the data buffer circuit 340 is improved by decreasing the frequency of (or eliminating) sending control information (tags) from Host 302 to the data buffer circuit or DC chip 340.

In a further embodiment, a memory system, architectural structure, and/or method is disclosed to improve the performance and or bandwidth of the communication link between the memory control circuit 330 and the data buffer circuit or DC chip 340. In one embodiment, the bandwidth of the communications link between the memory control circuit 330 and the data buffer circuit 340 is improved by decreasing the frequency of sending control information (location tags) from the memory control circuit 330 to the data buffer circuit (DC chip) 340. To reduce demand on the link between the memory control circuit 330 and DC chips 340, in one embodiment of performing a store operation, the Host 300 sends a store command and store data tag to the memory control circuit (AC chip) 330, and the AC chip 330 sends the store data command to the DC chip 340, but the AC chip 330 does not send the corresponding store data tag to the DC chip 340. Instead, the memory control circuit (AC chip) 330 and DC chips 340 both maintain a separate state machine-driven local address pointer or address sequencer 335, 345, e.g., store tag FIFO, that contains the same tags in the same sequence. The AC chip 330 and DC chips 340 use the same tag from its local address sequencer 335, 345, e.g., local FIFO, for a store operation. The AC chip 330 associates or maps the host store data tag to the next tag (location address) available in its local address sequencer 335, e.g., its local store data tag FIFO, and stores the related pair of tags to a mapping table 336.

Figure 4:
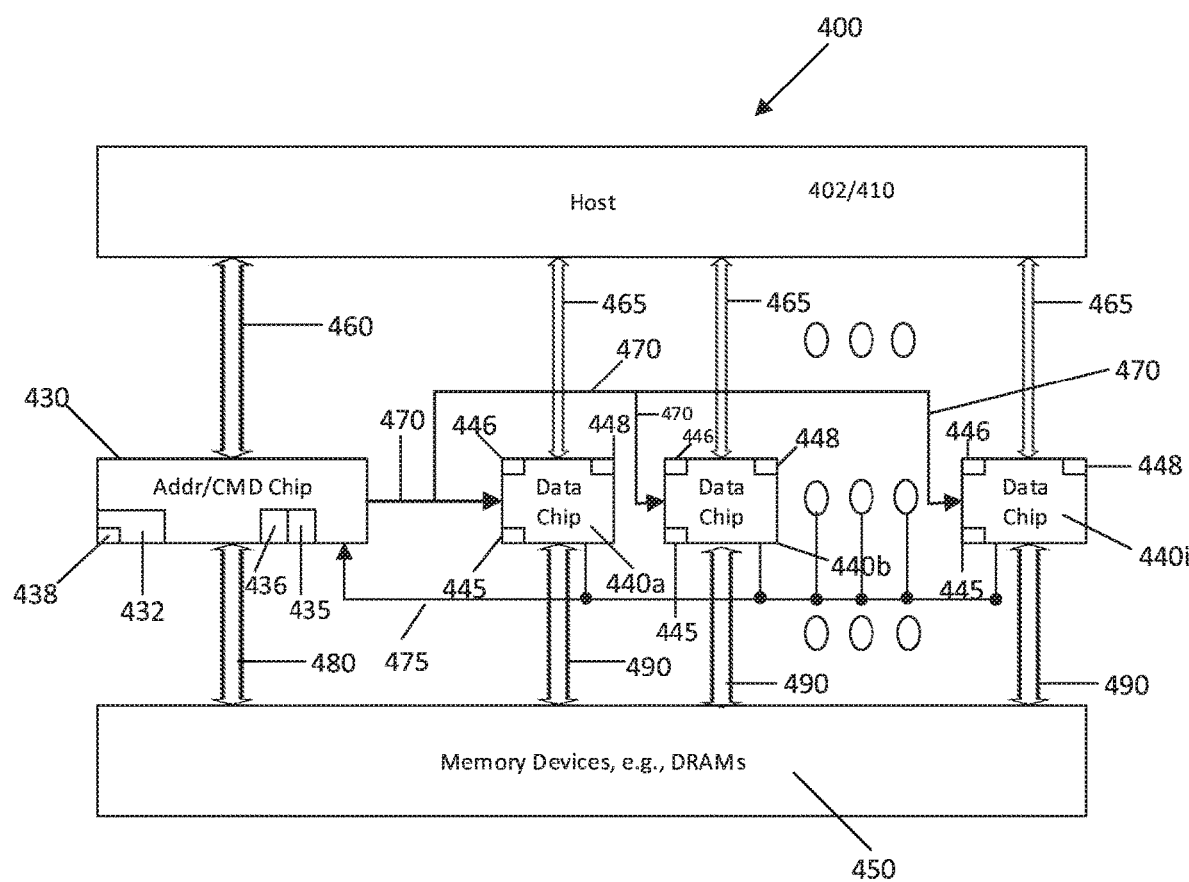
FIG. 4 diagrammatically depicts a distributed buffer memory system in accordance with one embodiment.

FIG. 4 illustrates a schematic illustration of a distributed buffer memory system 400 according to one embodiment. The system includes a plurality of memory devices 450, e.g. DRAMs. The DRAMs may be arranged on a module, usually a DIMM 325. The system 400 may have one or more DIMMs. The system may further include one or more memory control circuits or AC chips 430, and one or more data buffer circuits or DC chips 440. In one embodiment, each DIMM may include one memory control circuit or AC chip 430 and a plurality of data buffer circuits or DC chips 440 (9 or 10 chips per AC chip). Each DIMM 325 may have a plurality of memory devices, e.g., DRAMs 450, preferably arranged in groups of nine, e.g., nine (9), eighteen (18), twenty-seven (27), thirty-six (36) or more. The DIMMs may have an unequal number of memory devices, e.g., DRAMs 450. In one embodiment, the system is designed to support DDR4 or DDR5 memory systems, although other configurations and arrangements are contemplated. The memory control circuit 430 may or may not have a Regulated Clock Driver, and in one embodiment, the memory control circuit 430 may have a memory controller 432 and/or a memory scheduler 438.

Link 460 diagrammatically illustrated in FIG. 4 is a differential High Speed Serial (HSS) bus with eight (8) lanes from the Host 402/410 to the memory control circuit or AC chip 430 for sending commands to the memory subsystem 320 and one HSS lane back for reporting stats such as operations that are complete or error notification and detail. FIG. 5 shows one example of the address and command frame sent over link 460 from Host 402/410 to memory control circuit or AC chip 430. In FIG. 5, the address and command frame has two (2) bits (L0-L1) to specify the number of cycles to make up a frame; thirty-nine (39) bits (A0-A38) of addressable space; four (4) bits (C0-C3) of space for commands; seven (7) bits (Q0-Q6) for the tagfield match sent to the DC chips for write operations; one bit (ACK) for acknowledge for the upstream frame; and eleven (11) bits (P0-P10) for Cyclic Redundancy Check (CRC) code provided for lane error detection and isolation.

Link 465 is a HSS bus with two (2) lanes from the Host 402/410 to each data buffer circuit or DC chip 440 for store data and two (2) lanes from each DC chip 440 to the Host 402/410 for fetch data. For mainline operations, link 465 in an embodiment is used only for transmitting data and the required cyclic redundancy check (CRC) for protecting that data. The bandwidth of link 465 in one embodiment is not consumed for any kind of control information and may not have any bandwidth consumed for response information. All two lanes of bandwidth for link 465 is used in an embodiment to transmit data (and CRC). FIG. 6 shows one example of a data frame for Host 402/410 to DC chip 440 communication over link 465. In FIG. 6, 128 bits (D0-D127 in memory cycles (frames) 1-8) are data fields, and sixteen (16) bits (CRC0-CRC15 in memory cycle (frame) 9) are for CRC, so that nine (9) out of (9) frames (or 100% of the bandwidth of link 465) are used for data and CRC. By not using link 465 for transmitting control signals, e.g., tag or address locations, all nine (9) memory cycles are used for transmittal of data and CRC, which improves data transfer efficiency in link 465.

Link 470 is a broadcast (BCOM) bus from the memory control circuit or AC chip 430 to the data buffer circuits or DC chips 440 used to notify the DC chips when to execute the scheduled operations. For fetch operations only a command is sent over link 470 from the AC chip 430 to the DC chip 440. According to one aspect, for store operations the control memory circuit 430 cracks a store command into two suboperations called "write buffer" or "write-to-buffer," which writes data from the Host 402/410 into the data buffer on the DC chips 440, and "store buffer" or "store-from-buffer," which stores data from the DC chips 440 to the memory devices 450, e.g., DRAMs. For a write buffer, in one embodiment, a command is sent to the data buffer circuits or DC chips 440 from AC chip 430 over link 470, but a control signal, e.g., a location tag address, is not sent to the data buffer circuit, e.g., the write buffer, to save bandwidth. Instead, a state machine-driven address pointer or address sequencer 445 in each DC chip 440 tracks where the store data is to be written in the data buffer circuit, for example, the address or location in the write buffer. For a store buffer operation, both a command and control signal, e.g., a write buffer address, is sent to the data buffer circuit or DC chips 440. Operation of the memory subsystem will be described in more detail below.

An Error ATTN network 475 between data buffer circuits or DC chips 440 and memory control circuit or AC chip 430 may contain an Error ATTN signal from the data buffer circuits or DC chips 440 notifying the memory control circuit or AC chip 430 that a DC chip 440 took an error that requires reporting to the Host 402/410. Note that the DRAM ATTN signal that indicates a memory device 450, e.g., DRAM, took an error is routed from the memory device 450 back to its DC chip 440 instead of routing them directly back to the AC chip 430. The AC chip 430 must report this error to the Host 402/410 since the DC chips 440 have no response or control information in their upstream frame. The DC chip 440 forwards the memory device errors back to the AC chip 430 via link 475, but each DC chip 440 has knowledge that one of its memory devices, e.g., DRAMs 450, took an error. The AC chip 430 routes the error signal back to the Host. The Host 402/410 may invoke its error recovery routine, and non-mainline operations from the Host 402/410 can be used to read the status registers of the DC chips 440. The Host 402/410 is then able to isolate which DC chip 440 took the error, if the error occurred on the HSS link or was an ATTN from one of its memory devices, or if it was some other error occurring on the DC chip 440. The Host 402/410 may then take action as desired to recover from the error.

Link 480 is the command and address bus from the memory control circuit or AC chips 430 to the memory devices 450, e.g. DRAMs. Links 490 are the memory devices data buses used by the DC chip 440 to send store data to the memory devices and receive fetch data from the memory devices 450. Communication link 490 also receives the memory device ATTN signal.

Turning now to the operation of a memory system, during normal operations the Host 402/410 sends a store command to the memory control circuit or AC chip 430. The store command sent by the Host to the AC chip 430 may be processed, decoded or cracked into a "write buffer" command, which writes data from the Host into the data buffer on the DC chips 440, and a "store buffer" command, which stores data from the DC chips 440 to the memory devices 450. The "write buffer" command is scheduled for execution right away, and the "store buffer" command is scheduled for execution by the memory control circuit based on optimizing system performance.

The write buffer command is sent by the memory control circuit or AC chip 430 to the data buffer circuits or DC chips 440 over link 470 and the Host 402/410 sends data to be stored to the DC chips 440 over link 465, preferably after a configurable delay. No control signal is sent over the communication link between the Host and the data buffer circuits. In one embodiment, the AC chip does not send an address, tag or location to the DC chip 440 identifying where the store data should be located in the write buffer of the data buffer circuits 440. Instead, each DC chip 440 tracks through a state machine-driven address pointer or address sequencer 445 where the data from the Host for the next store operation should be written to in the write buffer of the DC chip 440. Each DC chip 440 can check the CRC codes from the store data received to verify that an error did not occur over the HSS link 465. If an error is found to have occurred, the DC chip 440 notifies the AC chip 430 via an Error ATTN signal over the link 475 that an error has taken place and the error is recorded in the DC chip's status register 448.

The AC chip 430 may include a scheduler 438 that optimizes the order of operations and system instructions and sends out commands. The scheduler 438 can reorder operations. The AC chip scheduler 438 may schedule the "store buffer" command when it is optimal for system performance to execute that operation. Bank collisions, periodic operations, and fetch commands can cause a store operation to be delayed to allow other operations to complete or execute ahead of it. Once the "store buffer" operation completes the store operation, the Host store command is considered complete, and the AC chip 430 sends an upstream frame to the Host via link 480 using as an example the format in FIG. 7 to indicate which operations completed.

In one embodiment, fetch operations start with the fetch command being sent to the AC chip 430 via communications link 460 because there is no need to send data ahead of time. Fetch operations may be prioritized in the system and if the buses are available for use, a fetch operation will bypass store operations in the queue to minimize latency. If, however, there are other pending fetch operations that need to be scheduled, the fetch operation will enter the memory control circuit scheduler or memory sequencer 438.

Once the memory control circuit memory scheduler 438 schedules the fetch operation to execute, the command signal and control signal, e.g., address (tag), is sent from the AC chip 430 over link 480 to the memory devices 450 and the DC chips 440 are informed by the AC chip 430 over link 470 that fetch data will arrive to be sent to the Host 402/410 in a fixed number of cycles. Once the fetch data arrives at the DC chips 440, the data is forwarded directly to the Host 410/402 over link 465. Fetch data preferably is not buffered as this would create additional latency. The AC chip 430 in response will then send an upstream frame to the Host notifying it that the fetch operation has completed.

The response frame indicating which operations are completed is shown in FIG. 7. In FIG. 7, two (2) bits (T0-T1) is the frame/type identifier; two (2) bits (R0-R1 (op1)) identifies the response type, e.g., store done, fetch complete, or attention response, for a first operation; seven (7) bits (Q0-Q6 (op1)) is the Command Queue Tag associated with the response type of the first operation; two (2) bits (D0-D1 (op1)) provides the frame offset code for a first operation (to specify when fetch data will return with respect to the beginning of the four (4) memory cycle frame); six (6) bits (CRC0-CRC5) is the CRC for the frame; and one bit (ACK) is the acknowledge for the downstream frames (e.g., acknowledgment for frame in FIG. 5 received by AC). For a store done response type operation, Q0-Q6 denotes the store done tag, whereas for a fetch completion response type operation, Q0-Q6 denotes the data tag associated with fetch data. When the operation is an attention (ATTN) response, one or both command queue tag fields may be overloaded to convey recovery and status error information back to Host. The response type fields R0-R1, the Command Queue fields Q0-Q6 and the frame offset fields D0-D1 have two operation fields—op1 and op2—and the fields for the second operation (op2) have the same definition as the fields for the first operation (op1). To optimize bandwidth, completion information may be sent for two operations at a time. Op2 is used to allow the AC to return two operations responses per frame (i.e., one store done operation and one fetch completion operation, two store done operations, or two fetch completion operations). The response frame sent by the AC chip to the Host when reporting error conditions would be different then FIG. 7.

Figure 8:
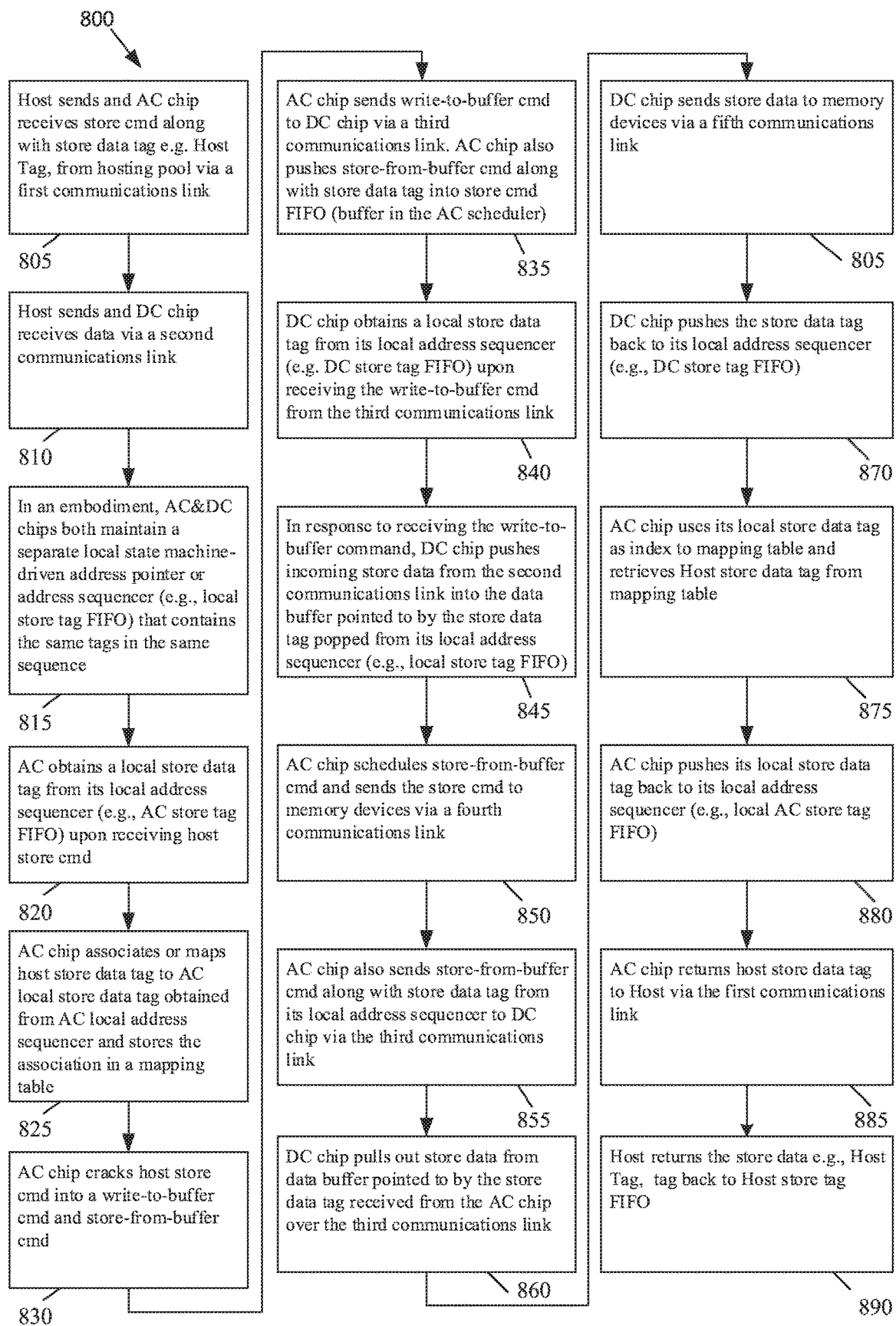
FIG. 8 depicts a flow diagram of a method of performing a store operation in accordance with one embodiment.

Further details of the operation of a memory system, including in certain embodiments distributed memory buffer systems, will be described. FIG. 8 is an exemplary flowchart in accordance with one embodiment illustrating and describing a method of storing data in a memory system, including a distributed buffer memory system, in accordance with one embodiment of the present disclosure. While the storing method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

At 805, a Host (e.g., processor, memory controller) sends a store command along with a store data tag or HOST TAG from the Host tag pool to a memory control circuit, e.g., an AC chip 430, via a first communications link, e.g., link 460 in FIG. 4. For ease of reference, the memory control circuit may be referred to as an AC circuit or AC chip in this discussion and in FIG. 8. The store data tag or HOST TAG from the Host tag pool correlates with and identifies the host store command. Later in the process, when the storing operation is complete, and a response is sent back to the Host from the AC chip telling the Host the operation is complete, this tag is part of that response so the Host knows which operation completed. In FIG. 5, the Address (location in DRAMS where the data is to be stored) is sent as bits A0-A38, whereas the tag that tracks the operation is Q0-Q6.

At 810, the Host sends data to be stored to a data buffer circuit, e.g., DC chip, via a different, second communications link, e.g., link 465 in FIG. 4. In one embodiment, no control signal, e.g., address tag, is sent over the communication link between the Host and the data buffer circuits. Only data (and CRC) in this embodiment is sent over the communication link (e.g., link 465 in FIG. 4) between the Host and the data buffer circuits. The data to be stored in the data buffer circuits or DC circuits may be sent to the DC circuits after a configurable (or programmable) delay. The delay may be a configurable or programmable fixed delay. By not sending an address tag over link 465, the efficiency of or ability of link 465 to transmit data may be increased. For ease of reference, the data buffer circuits may be referred to as DC circuits or DC chips in this discussion and in FIG. 8.

The AC circuit 430 and the DC circuit 440 in one embodiment may both maintain, as referred to at 815, a separate state machine-driven address pointer or address sequencer 435, 445, e.g. local store tag FIFO, that contains the same tags in the same sequence. As used herein, a local store data tag from the local address sequencers 435, 445 of the AC and DC circuits is a reference to a location or address in the data buffer circuit where data may be stored. A state machine-driven address pointer or address sequencer has a pool of tags that refer to or identify buffer (e.g., data buffer circuit) address locations, and the state machine-driven address pointer or address sequencer keeps track of the tags and or addresses. The local address sequencers 435, 445 of the AC circuit and DC circuit are preferably synchronized, and may be automatic and synchronized because the state machines controlling the FIFOs are synchronized.

At 820, the AC circuit 430 obtains or pops a local store data tag from its address sequencer 435, e.g., local store tag FIFO, upon receiving the Host store command. At 825, the AC chip associates e.g., maps, the Host store data tag to the local store data tag (e.g., the location on the DC chips where the data will be buffered) pointed to by its address sequencer 435, e.g., local store data tag FIFO, and stores the information in an index or mapping table 436. The mapping table 436 is a table that associates and or correlates local store data address tags pulled from the AC chip address sequencer 435 with the store data tag. The AC circuit at 830 decodes, processes, and/or cracks the Host store command into a write-to-buffer ("write buffer") command and store-from-buffer ("store buffer") command. At 835, the AC circuit 430 sends the write-to-buffer command to the DC circuit 440 via a third different communications link, e.g., link 470 in FIG. 4. In one embodiment, no control signal, e.g. local store tag, is sent to the DC circuit 440 specifying where to write the data to in the data buffer circuit 440. More specifically, the AC circuit 430 does not send a store data tag to the DC circuit 440 over the third communication link, e.g., link 470 in FIG. 4. The AC circuit will then push the store-from-buffer command along with the store data tag (buffer location where the store data is held) into store command buffer in the scheduler. That is the store-from-buffer command is pushed into store command buffer in the AC local store tag, such that this command can be scheduled later by the scheduler (See e.g., 850 in flowchart of FIG. 8).

At 840, the DC circuit obtains, generates, and/or pops a local store data tag from its local address sequencer 445, e.g., local store tag FIFO, upon receiving the write-to-buffer command from the third communications link, e.g., link 470 in FIG. 4. The local address sequencer 445 of the DC circuit preferably is synchronized with the local address sequencer 435 of the AC circuit so that the local store data tag points to the same location in the DC circuit. In response to receiving the write-to-buffer command, at 845, the DC circuit 440 pushes incoming data to be stored from the second communications link, e.g., link 465 in FIG. 4, into the data buffer pointed to by the store data tag obtained, generated, and/or popped from its local address sequencer 445, e.g., local store tag FIFO. The DC circuit 440 may push the data into its buffer after a configurable (or programmable) delay.

At 850, the AC circuit 430 schedules the store-from-buffer command and sends the store command to the one or more memory devices 450 via a fourth communications link, e.g., link 480 in FIG. 4. The store command may include the store command and the address location of where in the memory devices the data is to be stored. This store command is akin to the Host Store command that was earlier decoded or cracked into separate write-to-buffer and store-from-buffer commands. In one embodiment, this may be a DDR4 store operation that includes the store command and the address tag or location where the data is to be stored in the memory devices. The AC circuit 430 at 855 also sends a store-from-buffer command along with store data tag to the DC circuits 440 via the third communications link, e.g., link 470 in FIG. 4. The store data tag sent to the DC circuits is a local tag that informs the DC circuits where the data to be stored to the memory devices is located in the DC circuits. At 860, the DC circuits 440 pull out data to be stored from the data buffer pointed to by store data tag received from the AC circuit 430 via the third communication link, e.g., link 470 in FIG. 4. At 865, the DC circuits 440 send data to be stored to the memory devices 450 via a fifth communications link, e.g., link 490 in FIG. 4. From the point of view of the memory devices, the memory devices see a store operation, in one embodiment a DDR4 store operation, from the combination of the AC circuits and the DC circuits.

At 870, the DC circuit 440 pushes the store data tag back to its address sequencer 445, e.g. its local store tag FIFO. The AC circuit 430 uses its local store data tag as an index to the mapping table and at 875 retrieves Host store data tag from the AC circuit mapping table 436. At 880, the AC circuit 430 pushes its local store data tag back to its address sequencer 435, e.g., the AC chip local store tag FIFO. At 885, the AC circuit 430 returns the host store data tag to Host via the first communications link, e.g., link 460 in FIG. 4. Return of the HOST tag indicates that the operation or command associated with that tag is complete. And at 890, the Host returns the store data tag back to the Host tag pool. While FIG. 8 discloses and describes the method as a series of steps it will be appreciated that the order described above and in FIG. 8 may be changed.

Figure 9:
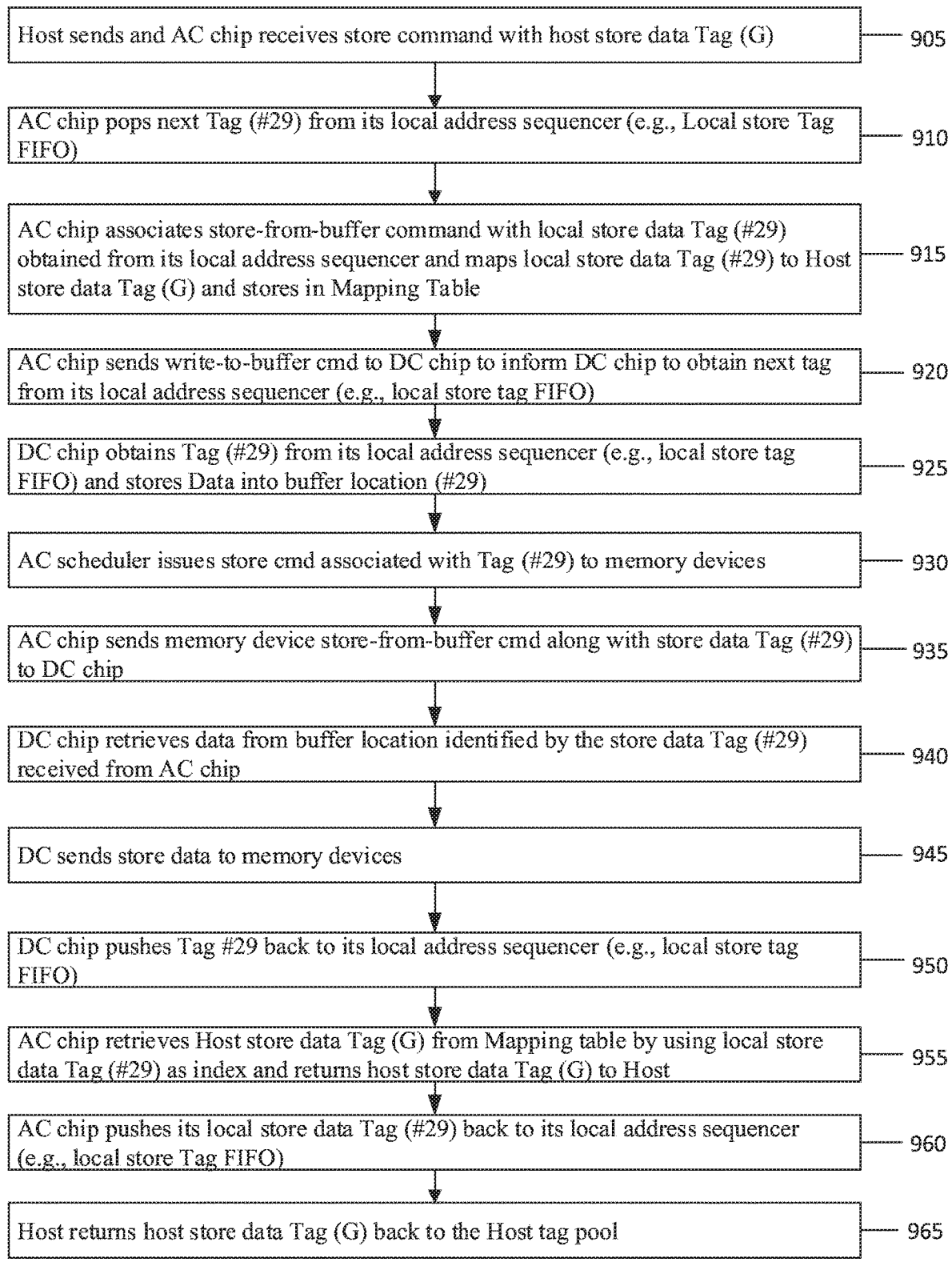
FIG. 9 depicts a flow diagram of a method of mapping store operations in a memory subsystem in accordance with one embodiment.

In one aspect of the system, architecture, and method of storing data in a memory system, a memory control circuit uses a remote address sequencer to keep track of where in the write buffer of a data buffer circuit to write data for the next store operation. Using synchronized state machine-driven address pointers or address sequencers to track where data should be written in the data buffer circuit, e.g., the buffer address, should improve the efficiency of the data link between the Host and DC chips and the efficiency of the link between the AC chip and the DC chips. FIG. 9 shows an exemplary flow chart illustrating and describing a method of how a distributed memory buffer system with an AC circuit controlled address sequencer can use a remote sequencer to keep track of where in the write buffer of a data buffer circuit, e.g., DC chip, to write data for the next operation. The method of FIG. 9 is described in connection with FIG. 10 which illustrates the mapping table and the state machine-driven address pointer or address sequencer 435, 445, e.g., the local store tag FIFO, of the AC and DC chips. While the method 900 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 9, but the process may be integrated and/or one or more steps may be performed together, simultaneously, or the steps may be performed in the order disclosed or in an alternate order.

Figure 10:
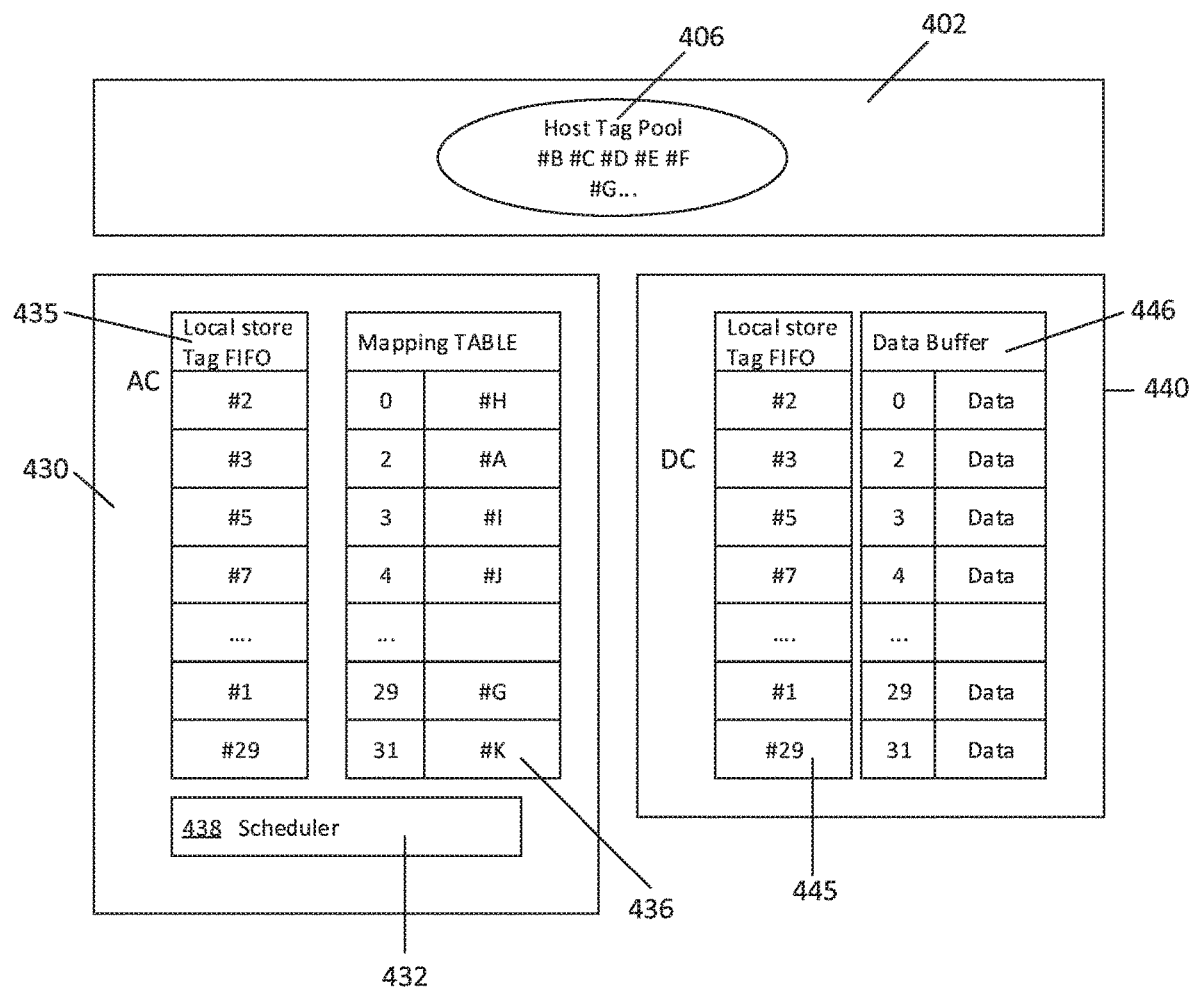
FIG. 10 depicts a diagrammatic illustration of a remote address sequencer mapping store operations in a memory subsystem in accordance with one embodiment.

In the exemplary method of FIG. 9, at 905, the Host 402 sends and the memory control circuit 430 receives a store command with store data tag. The store data tag may be a host store data tag that the Host obtained, generated or popped from the Host tag pool 406. For ease of reference, the memory control circuit in FIG. 9 and FIG. 10 alternatively may be referred to as an AC circuit or AC chip. In the example shown in FIG. 10, the Host 402 gets the store data tag "G" from the Host Tag Pool 406. The store data tag correlates and identifies the Host store command. The store command identifies the location in the memory devices to store the data and in FIG. 5, the bits A0-A38 are the location in the memory devices to store the data, whereas bits Q0-6 are the Host tag used to identify the command. Upon receipt of the store command, the AC circuit at 910 in FIG. 9 obtains or pops the next tag from its local address sequencer. In the example of FIG. 10, the next tag that the AC circuit 430 pops from its local address sequencer, e.g., Local store tag FIFO 435, is tag #29.

The AC circuit at 915 in FIG. 9 associates the store-from-buffer command with the local tag obtained from the AC circuit address sequencer 435, e.g., local store data tag, and maps the tag from the AC circuit address sequencer, e.g., local store data tag, to the store data tag received from the Host tag pool, and stores the information (e.g., relationship, association) in mapping table 436 as shown in FIG. 10. In this manner, the local store data tag is associated with the command and store data tag received from the Host. In the example of FIG. 10, the next tag from the AC circuit address sequencer 435 is tag #29 and the local store data tag #29 is mapped to Host store data tag G so that store data tag #29 is associated with Host tag G.

The AC circuit at 920 in FIG. 9, sends the write-to-buffer command to the DC circuit 440 to inform the DC circuit 440 to obtain or pop the next tag from its local address sequencer, e.g., local store tag FIFO 445, shown in FIG. 10.

At 925 in FIG. 9, the DC circuit processes, obtains, or pops the next tag from its local address sequencer, e.g., local store tag FIFO 445, and stores the data from the Host 402 into the data buffer location pointed to by the DC circuit's local address sequencer 445. In the example of FIG. 10, the DC circuit obtains tag #29 from its local address sequencer 445, e.g., its local Store Tag FIFO, and stores the data from the Host into the data buffer location that correlates with tag #29. The local address sequencer 435 of the AC circuit 430 should be synchronized with the local address sequencer 445 of the DC circuit 440 so that the sequencers point to the same address/location in the DC circuit, e.g., memory buffer.

The AC circuit scheduler 448 shown in FIG. 10 issues at 930 in FIG. 9 the store command along with the associated local store tag in its mapping table to the memory devices. In the example of FIG. 9 and FIG. 10, the AC circuit 430 sends store command associated with tag #29 to the memory devices 450 in FIG. 4. The AC circuit sends to the memory devices the command (Fetch or Store) and the Memory Address (A0-A38 in FIG. 5) to the Memory devices. The AC circuit at 935 in FIG. 9 sends a store-from-buffer command with the local store data tag to the DC circuit. In the example of FIG. 10, the AC circuit scheduler 438 issues the store-from-buffer command associated with tag #29 to the DC circuits 440. At 940 in FIG. 9, the DC circuit retrieves data from the buffer location using the local store tag received from the AC circuit. In the example of FIG. 10, the DC circuit 440 retrieves data from buffer location #29 using local tag #29 received from the AC circuit 430.

The DC circuit stores the data to the memory devices at 945 in FIG. 9. In the example of FIG. 10, the DC circuit 440 stores the data to the memory devices (e.g., memory devices 450 in FIG. 4) in the location originally identified by the host store command (the location or address identified by bits A0-A38 in FIG. 5). The DC circuit 440 at 950 in FIG. 9 pushes the local tag back to its address sequencer, e.g., local store tag FIFO. In the example of FIG. 10, the DC circuit 440 pushes back or returns tag #29 to its Local store tag FIFO 445. At 955 in FIG. 9, the AC circuit 430 retrieves the Host Tag from its mapping table 436 by using the local store tag as an index and returns the Host store data tag to Host at 955. In the example of FIG. 10, the AC circuit retrieves host tag G from its mapping table 436 by using tag #29 as an index and returns host store data tag G to Host. At 960 in FIG. 9, the AC circuit 430 pushes its local store data tag back to its local address sequencer. In the example of FIG. 10, the AC circuit 430 pushes or returns its local store data tag #29 back to local store tag FIFO 435. The Host, at 965 in FIG. 9, returns host store data tag back to the Host tag pool. In the example of FIG. 10, the Host 402 returns host store data tag G back to the Host tag pool 406.

Figure 11:
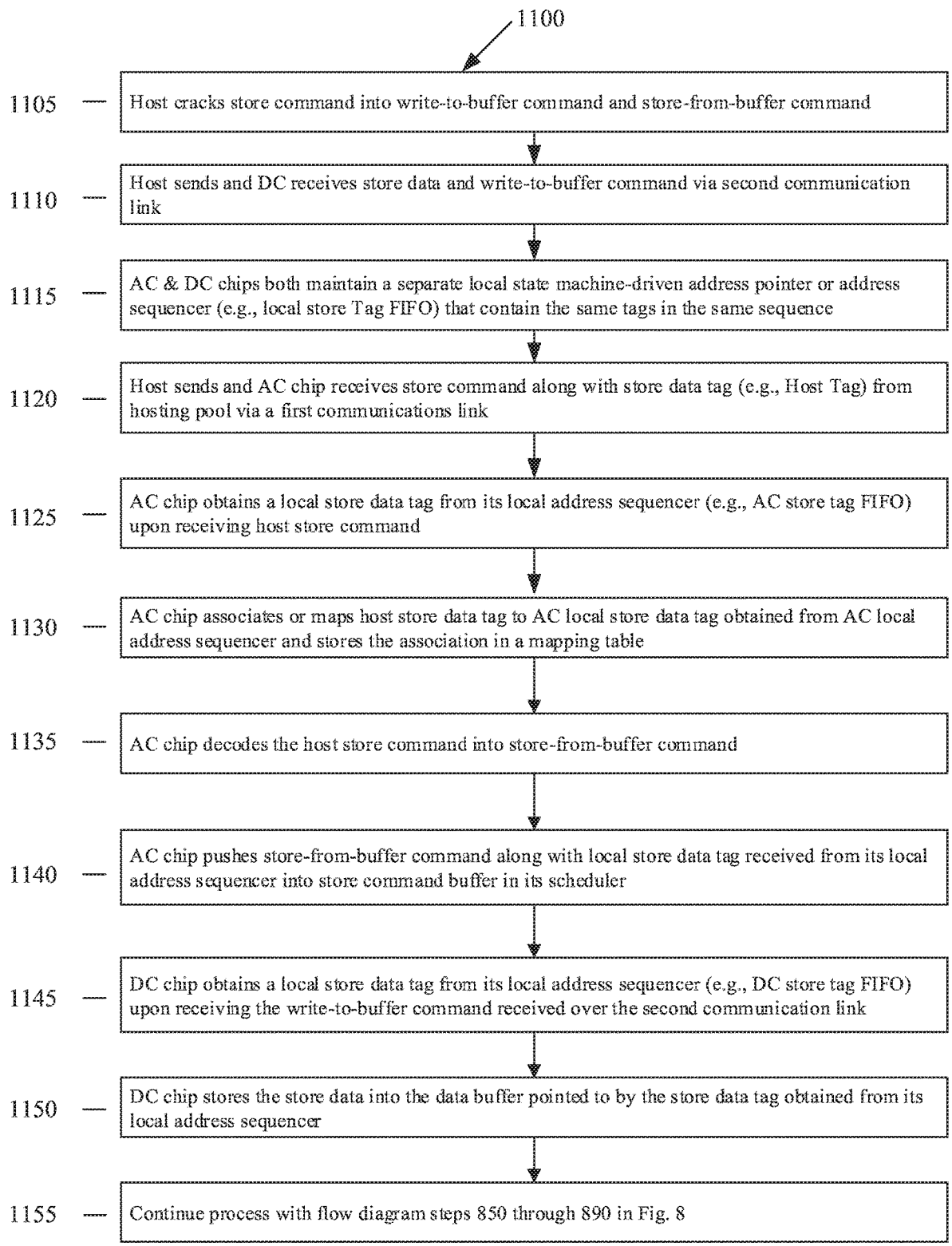
FIG. 11 depicts a flow diagram of an alternative method of performing a store operation in accordance with one embodiment.

An alternative method according to one embodiment of storing data in a memory system is shown in FIG. 11. While the method 1100 is described for the sake of convenience and not with an intent of limiting the disclosure as comprising a series and or a number of steps, it is to be understood that the process does not need to be performed as a series of steps and or the steps do not need to be performed in the order shown and described with respect to FIG. 11, but the process may be integrated and or one or more steps may be performed together, simultaneously, or the steps may be performed in the order disclosed or in an alternative order.

In the exemplary method of FIG. 11, at 1105 the Host cracks the store command into write-to-buffer command and store-from-buffer command. At 1110, the Host sends and the DC chip receives store data and the write-to-buffer command over the communications link between the Host and the DC circuit, e.g., link 465 in FIG. 4. At 1115, AC and DC chips both maintain separate local state machine-driven address pointers or local address sequencers (e.g., local store tag FIFO) that are synchronized and contain the same tags in the same order. In this embodiment, the local store tags identify a location in the memory data buffer circuit, e.g., address or location in the DC circuit. At 1120, the Host sends and the AC circuit receives store command along with store data tag (e.g., Host Tag) from hosting pool via a communications link between the Host and the AC circuit, e.g., link 460 in FIG. 4.

At 1125, the AC circuit obtains a local store data tag from its local address sequencer (e.g., AC store tag FIFO) upon receiving the host store data command. The AC circuit, at 1130, associates or maps host store data tag to AC local store data tag received or obtained from AC local address sequencer and stores the association in a mapping table. At 1135, the AC circuit decodes the host store command into a store-from-buffer command. The AC circuit in this embodiment does not need to send the write-to-buffer command to the DC circuit since the write-to-buffer command is sent directly from the Host to the DC circuit. At 1140, the AC circuit pushes store from buffer command along with local store data received from its local address sequencer (which corresponds to and identifies address location in the buffer memory or DC circuits) into store command buffer in its scheduler. At 1145, the DC circuit 440 obtains or pops a local store data tag from its address sequencer 445, e.g., local store tag FIFO, upon receiving the write-to-buffer command, and at 1150 stores the store data into the data buffer pointed to by the store data tag obtained from its local address sequencer.

The process of storing data in FIG. 11 continues with the operation shown at blocks 850 through 890 in FIG. 8 and described above. In this embodiment of storing data, the AC circuit 430 decodes the host store command into store-from-buffer command. The AC circuit 430 no longer needs to send the write-to-buffer command to the DC circuits 440 since the DC circuits knows where to store the data in the DC circuits (buffer memory). In this embodiment, the bandwidth of the BCOM link between the AC circuit 430 and the DC circuit 440 is not utilized for write-to-buffer commands. However, the bandwidth of the link between the Host and the DC circuits is not used to only transfer data. Instead of the AC circuit instructing the DC circuits to pop their local tag FIFO, as in the methods of FIGS. 8 and 9, Host tells the DC circuits to pop their local tag FIFO.

Use of a synchronized state machine to track the address pointer, which stores the buffer address where data should be written, improves efficiency of the data link between the Host and the DC chips and the AC chip and DC chips, but it may create a reliability issue. If a state machine-driven address pointer e.g., address sequencer, such as, for example, local store tag FIFO, gets out of synchronization, then the data buffer circuit will continuously write the store data to a different address than where the memory control circuit (AC chip) will tell the data to be stored in the memory devices. When this occurs there is no way to detect that one of the state machines, e.g., address sequencers, is out of synchronization and the error may go unnoticed until ECC errors (are detected) from read operations. When a read operation is performed for the address associated with faulty data, e.g., the location previously stored to with an out of sync state-machine, the ECC would be bad.

To reduce the risk of the address sequencer, e.g., the local store tag FIFO, of the memory control circuit (AC chip) and data buffer circuits (DC chips) from getting out of sync, a periodic tag check and resynchronization process may be implemented. In one embodiment, the memory control circuit (AC circuit) can send the next to be used store data tag to the data buffer circuits (DC chips) during an idle cycle of the BCOM link, and/or in an alternative embodiment, the data buffer circuit or DC chip can send the next to be used store data tag to the Host. Both processes will be described in more detail below.

Figure 12:
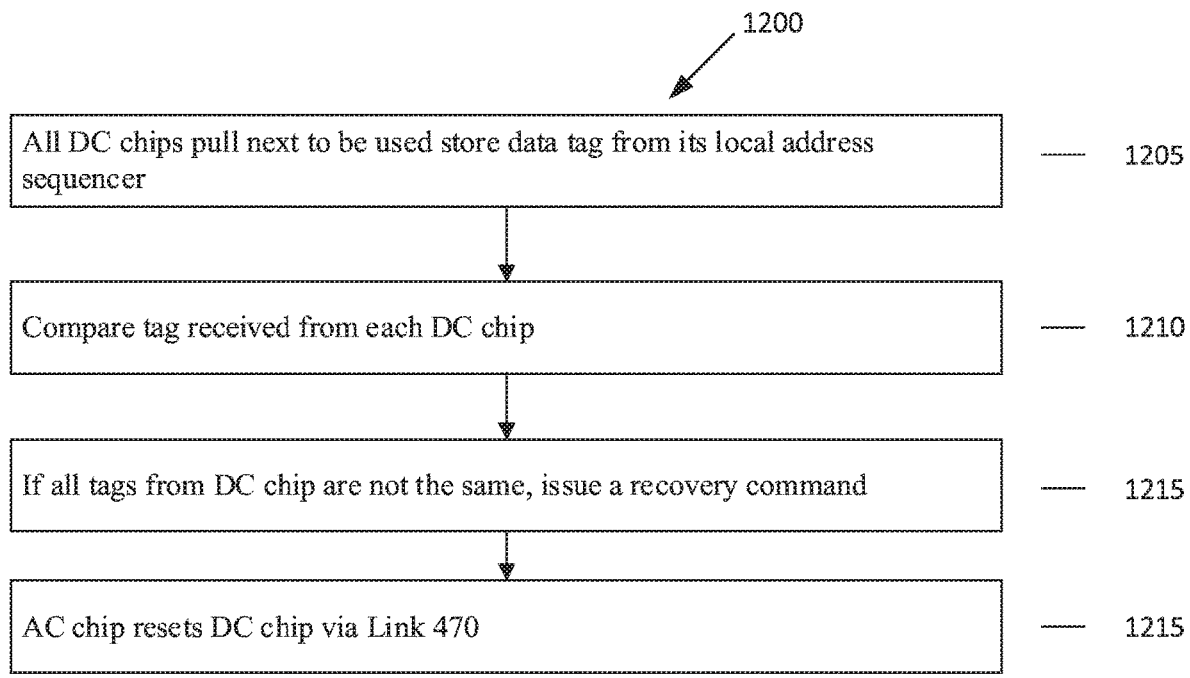
FIG. 12 depicts a flow diagram of a method of checking and/or synchronizing tags in a memory subsystem in accordance with one embodiment.

One method of checking if the state machine-driven address pointers of the memory control circuit and the data buffer circuits are out of synchronization is diagrammatically shown in the flow chart in FIG. 12. While the method 1200 in FIG. 12 is described for the sake of convenience and not with an intent of limiting the disclosure as comprising a series and or a number of steps, it is to be understood that the process does not to be need to be performed as a series of steps and or the steps do not need to be performed in the order shown and described with respect to FIG. 12, but the process may be integrated and or one or more steps may be performed together, simultaneously, or the steps may be performed in the order disclosed or in an alternative order.

At 1205 in FIG. 12, all the DC chips send their "next to be written address" from their local address sequencer to the Host. For example, the DC chips 440 in FIG. 4 may send their next to be written address, e.g., local store data tag, from its local address sequencer, e.g., local store tag FIFO 445 in FIG. 10, to the Host via the second link 465. At 1210 in FIG. 12, the tags received from each DC chip 440 are compared, preferably by the Host. If any of the tags from the DC chips are different, then at 1215, a recovery command may be issued to the AC chip 430, preferably by the Host via link 460 so that the system will enter a recovery mode. As part of the recovery, at 1220 in FIG. 12, the AC chip 430 may reset the DC chip 440 via link 470. The system may undergo the process of checking the synchronization of the AC chip local address sequencer and DC chip local address sequencers on a periodic basis, when the link to Host is idle, or according to a set frequency or time period if the check does not occur earlier. Note that the Host does not know if the data buffer circuits (DC chips) are sending the correct address tags as the memory control circuit (AC chip) is controlling the address pointers, e.g., the address sequencers, for the system. The Host merely detects an error has occurred due to the fact that the DC chips don't all report the same next to be written address. The Host may read the status registers of the data buffer circuits (DC chips) to see where the error occurred and what the errors were. However, it is likely the Host is able to isolate which DC chip took the error without polling the status registers as it is highly unlikely that more than one DC chip will have an address sequencer (pointer) out of sync.

The recovery mode may include one or more of the following actions. The Host, e.g., processor or Host memory controller, may stop sending new operations out on the memory channel, the Host may flush all incomplete store operations, and/or the Host may wait for all fetch operations to complete. Appropriate actions may be taken, such as, for example, data queues may be drained, a lane may be spared, etc. The action may include removing or sparing out a bad DC chip if it is taking frequent errors. Some of these actions typically require entering a non-mainline mode on the memory system. The Host may also issue a state machine reset operation causing the memory control circuit (AC chip) and data buffer circuits (DC chips) all to reinitialize their state machine-driven address pointers or address sequencers. The AC chip may reset the DC chip local address sequencer by sending a command via link 470. In the preferred embodiment, such actions would be a non-mainline operation. After taking appropriate action, the system and Host may resume issuing commands on the memory channel.

Figure 13:
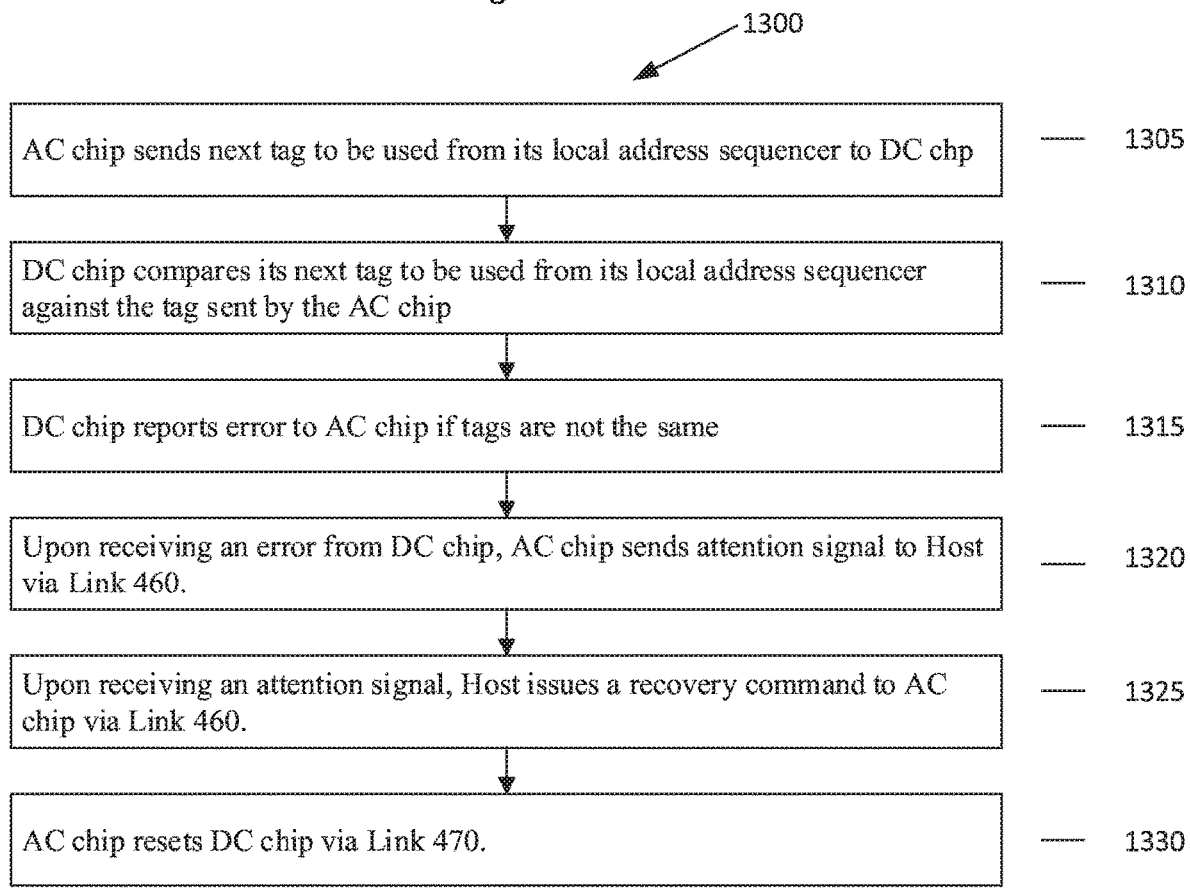
FIG. 13 depicts a flow diagram of an alternative method of checking and/or synchronizing tags in a memory subsystem in accordance with one embodiment.

An alternative method to check whether the local address sequencers of the memory control circuit (AC chip) and the data buffer circuit (DC chip) are out of sync is shown in the flow diagram of FIG. 13. While the method 1300 in FIG. 13 is described for the sake of convenience and not with an intent of limiting the disclosure as comprising a series and or a number of steps, it is to be understood that the process does not to be need to be performed as a series of steps and or the steps do not need to be performed in the order shown and described with respect to FIG. 13, but the process may be integrated and or one or more steps may be performed together, simultaneously, or the steps may be performed in the order disclosed or in an alternative order.

The method of checking if the local address sequencers are in synchronization may also involve undergoing corrective actions. In one embodiment, corrective actions may include having the AC chip send a periodic SYNC command to the DC chips. In one embodiment, the AC chip may check if BCOM link 470 is idle. Alternatively, or in addition thereto, if the local address sequencers are not checked after a certain amount of time or number of operations, the system may nevertheless undergo a synchronization check according to one embodiment as described below with respect to FIG. 13. In the system where the communications link 470 is fully utilized where no idle cycle can be found for the AC chip 430 to send its next to be used tag after a programmable amount of time, the AC chip 430 signals its scheduler 438 to pause after the AC chip 430 sends the next to be used store data tag to all the DC chips 440 via link 470 so that the system can undergo a synchronization check. At 1305 in FIG. 13, the memory control circuit (AC chip) may send the next to be written to address (tag) from the AC chip local address sequencer, e.g., its local store tag FIFO, to the data buffer circuits (DC chips). In one example, the AC chip 430 may send its next to be written address tag from its local store tag FIFO 435 over the BCOM bus (link 470) to the DC chip 440. At 410 in FIG. 13, each DC chip 440 compares its next to be written to address (tag) from its local address sequencer, e.g., its local store data tag FIFO 445, against the tag sent by the AC chip 430 to check that the DC chip's address pointer (address sequencer) is correct. If one of the DC chips 440 are in error at 1315 in FIG. 13, the DC chip 440 notifies the AC chip 1030 through the ATTN signal over link 475.

This ATTN signal provides no information about which DC chip took the error, as this is a wired OR signal. At 1320 in FIG. 13, the AC chip 440 then sends the error ATTN signal to the Host via link 460. The Host then may enter a recovery mode. Upon receiving an attention signal, the Host at 1325 in FIG. 13 may issue a recovery command to the AC chip 430 via link 460. The Host, however, no longer knows what is wrong and where, as it did when the DC chips simply sent the next address from the address sequencer (address pointer) to the Host. The system may enter a recovery mode whereby the Host may stop sending new operations out on the memory channel and flush all incomplete operations. Fetch and Store operations should be flushed since the Host doesn't know what is wrong or where. The system may enter a non-mainline operation. The Host may read the status registers from the DC chip registers to see where and what errors occurred. Now that the Host knows what is wrong and where, the Host may possibly take action. The action could be to spare out a bad DC chip if it is taking frequent errors.

Actions may further include issuing a state-machine reset operation causing the AC chip and DC chips all to reinitialize their state machine-driven address pointers, e.g., address sequencers. The AC chip at 1330 in FIG. 13 may reset the DC chip(s) 440 via link 470. After appropriate action, the system may exit non-mainline mode and resume issuing commands on the memory channel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory system for storing data in response to commands received from a Host, the memory system comprising:
    a memory control circuit to receive commands from the Host and to output module command and control signals;
    at least one memory device configured to store data and receive command signals from the memory control circuit;
    at least one data buffer circuit associated with the at least one memory device, the at least one data buffer circuit having a logic circuit to track where to write data for a store operation in the at least one data buffer circuit;
    a communications link for communicating data between the Host and the at least one data buffer circuit; and
    a control communications link between the memory control circuit and the at least one data buffer circuit,
    wherein the memory control circuit is configured to:
    in response to receiving a Host store command and store data tag from the Host, obtain a local store data tag from a memory control circuit local address sequencer;
    associate the Host store data tag with the memory control circuit store data tag; and
    store the relationship in a mapping table in the memory control circuit, and
    wherein the at least one data buffer circuit is configured to:
    in response to receiving a write-to-buffer command, obtain a local store data tag from a data buffer circuit local address sequencer that points to a storage location within the at least one data buffer circuit; and
    push incoming store data into the data buffer storage location pointed to by the data buffer circuit's local address sequencer.

2. The system of claim 1, wherein no store data tag specifying the location to store data in the at least one data buffer circuit is sent to the at least one data buffer circuit over the communications link between the Host and the at least one data buffer circuit.

3. The system of claim 1, wherein the memory control circuit is further configured to:
    in response to receiving the Host store command, process the Host store command into a write-to-buffer command and store-from-buffer command; and
    send the write-to-buffer command to the at least one data buffer circuit over the control communications link, but not send a tag to the at least one data buffer circuit specifying the location to store the data in the at least one data buffer circuit.

4. The system of claim 3, wherein the memory control circuit is further configured to send the store-from-buffer command along with the local store data tag received from its local address sequencer to the at least one data buffer circuit over the control communications link, and to send the store command to the at least one memory device.

5. The system of claim 4, wherein the at least one data buffer circuit is further configured to cause the at least one data buffer circuit to pull store data from the data buffer location pointed to by the store data tag received from the memory control circuit over the control communications link and send the store data to the at least one memory device.

6. The system of claim 1, wherein the memory control circuit has a logic circuit and the logic circuit in the memory control circuit for writing data in a store operation comprises a state machine-driven local address pointer that identifies the next address tag location of the at least one data buffer circuit to write data to, and wherein the at least one data buffer circuit comprises a state machine-driven local address pointer that identifies the next address tag location of the at least one data buffer circuit to write data, wherein the state machine-driven local address pointer of the memory control circuit is synchronized with the state machine-driven local address pointer of the at least one data buffer circuit.

7. The memory system of claim 6, wherein the memory control circuit local address sequencer and the at least one data buffer circuit local address sequencer both contain the same tags in the same sequence.

8. The memory system of claim 6, wherein the memory control circuit does not send the write-to-buffer data tag to the at least one data buffer circuit.

9. The memory system of claim 6, wherein the data communications link includes a communications link between the Host and the at least one data buffer circuit, and the at least one data buffer circuit and the at least one memory device, and only data and CRC is transmitted on the communications link between the at least one data buffer circuit and the Host.

10. The memory system of claim 1, further comprising at least one module having the memory control circuit formed on a single chip on the module, having a group of data buffer circuits formed on separate chips on the module, and a plurality of memory devices formed as chips and organized in groups on the module, and wherein the memory control circuit comprises a state machine-driven local address pointer that identifies the next address tag location of the data buffer to write data to, and wherein each of the data buffer circuits comprises a state machine-driven local address pointer that identifies the next address tag location in that data buffer circuit to write data to, wherein the state machine-driven local address pointer of the memory circuit is synchronized with the state machine-driven local address pointer of all the data buffer circuits.

11. A memory system for storing data in response to commands received from a Host, the memory system comprising:
   a memory control circuit to receive commands from the Host and to output module command and control signals;
   at least one memory device configured to store data and receive command signals from the memory control circuit;
   at least one data buffer circuit associated with the at least one memory device;
   a communications link for communicating data between the Host and the at least one data buffer circuit; and
   a control communications link between the memory control circuit and the at least one data buffer circuit,
   wherein the memory control circuit is configured to:
   in response to receiving a Host store command and store data tag from the Host, obtain a local store data tag from a memory control circuit local address sequencer;
   associate the Host store data tag with the memory control circuit store data tag; and
   store the relationship in a mapping table in the memory control circuit, and
      wherein the at least one data buffer circuit is configured to:
   in response to receiving a write-to-buffer command, obtain a local store data tag from a data buffer circuit local address sequencer that points to a storage location within the at least one data buffer circuit; and
   push incoming store data into the data buffer pointed to by the data buffer circuit's local address sequencer, and
      wherein the memory control circuit local address sequencer and the at least one data buffer circuit local address sequencer both contain the same tags in the same sequence.

12. The system of claim 11, wherein no store data tag specifying the location to store data in the at least one data buffer circuit is sent to the at least one data buffer circuit over the communications link between the Host and the at least one data buffer circuit.

13. The system of claim 11, wherein the memory control circuit is further configured to:
   in response to receiving the Host store command, process the Host store command into a write-to-buffer command and store-from-buffer command; and
   send the write-to-buffer command to the at least one data buffer circuit over the control communications link, but not send a tag to the at least one data buffer circuit specifying the location to store the data in the at least one data buffer circuit.

14. The system of claim 13, wherein the at least one data buffer circuit includes a logic circuit to track where to write data for a store operation in the at least one data buffer circuit.

15. The system of claim 14, wherein the at least one data buffer circuit is configured to:
   in response to receiving the write-to-buffer command, obtain a local store data tag from the data buffer circuit local address sequencer that points to a storage location within the at least one data buffer circuit; and
   push incoming store data into the data buffer storage location pointed to by the data buffer circuit's local address sequencer.

16. The system of claim 13, wherein the memory control circuit is further configured to send the store-from-buffer command along with the local store data tag received from its local address sequencer to the at least one data buffer circuit over the control communications link, and to send the store command to the at least one memory device.

17. The system of claim 16, wherein the at least one data buffer circuit is further configured to cause the at least one data buffer circuit to pull store data from the data buffer location pointed to by the store data tag received from the memory control circuit over the control communications link and send the store data to the at least one memory device.

18. The system of claim 11, wherein the memory control circuit has a logic circuit and the logic circuit in the memory control circuit for writing data in a store operation comprises a state machine-driven local address pointer that identifies the next address tag location of the at least one data buffer circuit to write data to, and wherein the at least one data buffer circuit comprises a state machine-driven local address pointer that identifies the next address tag location of the at least one data buffer circuit to write data, wherein the state machine-driven local address pointer of the memory control circuit is synchronized with the state machine-driven local address pointer of the at least one data buffer circuit.

19. The memory system of claim 18, wherein the memory control circuit does not send a write-to-buffer data tag to the at least one data buffer circuit.

20. The memory system of claim 11, further comprising at least one module having the memory control circuit formed on a single chip on the module, having a group of data buffer circuits formed on separate chips on the module, and a plurality of memory devices formed as chips and organized in groups on the module, and wherein the memory control circuit comprises a state machine-driven local address pointer that identifies the next address tag location of the data buffer to write data to, and wherein each of the data buffer circuits comprises a state machine-driven local address pointer that identifies the next address tag location in that data buffer circuit to write data to, wherein the state machine-driven local address pointer of the memory circuit is synchronized with the state machine-driven local address pointer of all the data buffer circuits.

* * * * *